United States Patent [19]

Payne et al.

[11] Patent Number: 5,412,291

[45] Date of Patent: May 2, 1995

[54] RECONFIGURABLE APPLIANCE ELECTRONIC CONTROL SYSTEM WITH AUTOMATIC MODEL DETERMINATION, INTERNALLY RESTRUCTURABLE CONTROL AND FLEXIBLE PROGRAMMABLE TEST MODES

[75] Inventors: Thomas R. Payne; Steven A. Rice, both of Louisville, Ky.

[73] Assignee: General Electric Company, Louisville, Ky.

[21] Appl. No.: 182,463

[22] Filed: Jan. 18, 1994

Related U.S. Application Data

[62] Division of Ser. No. 968,991, Oct. 30, 1992, Pat. No. 5,306,995.

[51] Int. Cl.⁶ .............................................. H02P 1/58
[52] U.S. Cl. ..................................... 318/102; 318/16; 68/12.23
[58] Field of Search ................ 318/561, 567, 671, 101, 318/102, 103, 16; 340/825.03, 825.22, 825.06; 68/12.02, 12.12, 12.16, 12.23, 12.01

[56] References Cited

U.S. PATENT DOCUMENTS

| | | |
|---|---|---|
| 3,654,607 | 4/1972 | Wavre et al. . |
| 3,812,337 | 5/1974 | Crosley . |
| 3,908,117 | 9/1975 | Naruse et al. . |
| 4,105,928 | 8/1978 | Leconte . |
| 4,121,197 | 10/1978 | Ogawa et al. . |
| 4,216,461 | 8/1980 | Werth et al. ........................ 340/149 |
| 4,306,219 | 12/1981 | Main et al. ..................... 340/825.54 |
| 4,369,442 | 1/1983 | Werth et al. ..................... 340/825.35 |
| 4,752,909 | 6/1988 | Fujiwara et al. . |
| 4,774,441 | 9/1988 | Toyomasu et al. . |

*Primary Examiner*—Bentsu Ro
*Attorney, Agent, or Firm*—H. Neil Houser

[57] ABSTRACT

A highly flexible electronic control system which is readily reconfigurable or reprogrammable to suit more than one machine, such as more than one laundry appliance. Control parameters are input to the controller over a communications link, which may be an optical communications link. The controller is automatically adaptable to particular ones of a plurality of different machines, for example laundry appliances in the form of a two-speed washer, a one-speed washer, an electric dryer and a gas dryer. The controller determines the particular appliance by applying signals to particular terminals of a connector connected to a machine to be interrogated. Other terminals are monitored to logically recognize the particular appliance. Thereafter, the control system implements functions appropriate to the particular appliance. An operation sequencing facility termed an "internally restructurable control" is disclosed, a specific form of which is a testing facility termed "internal test mode," in which case the parameters include specifications of particular functional element states to be established in a sequence, as well as time durations for selected ones of the functional element states. In another facility, termed a "diagnostic mode", the parameters indicate particular changes in controller output states.

13 Claims, 25 Drawing Sheets

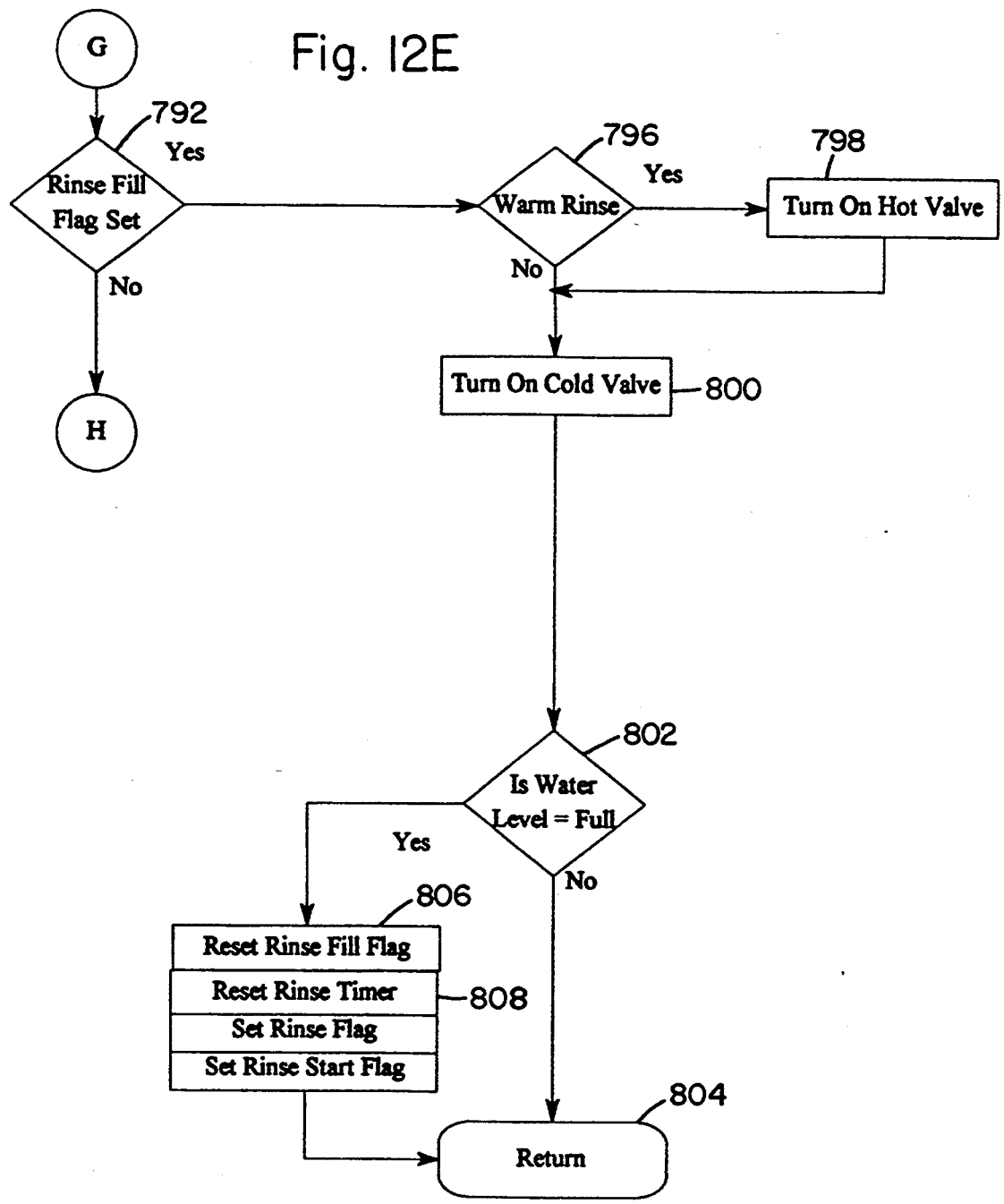

RECONFIGURABLE APPLIANCE ELECTRONIC CONTROL SYSTEM WITH AUTOMATIC MODEL DETERMINATION, INTERNALLY RESTRUCTURABLE CONTROL AND FLEXIBLE PROGRAMMABLE TEST MODES

This is a division of application Ser. No. 07/968,991, filed Oct. 30, 1992, now U.S. Pat. No. 5,306,995.

BACKGROUND OF THE INVENTION

The present invention relates generally to electronic appliance controllers and, more particularly, to electronic control systems which are independent of the type of appliance, which are internally restructurable to suit different appliance operating modes and which include programmable test mode capabilities likewise adaptable to different appliances, and which are automatically adaptable to different appliances.

Several aspects of the electronic control system disclosed herein are disclosed in greater detail in concurrently-filed application Ser. No. 07/969,139, filed Oct. 30, 1992, by Steven A. Rice, Thomas R. Payne and William W. Wead entitled "Appliance Electronic Control System with Programmable Parameters Including Programmable and Reconfigurable Fuzzy Logic Controller", and in concurrently-filed application Ser. No. 07/968,831 filed Oct. 30, 1992, by Thomas R. Payne, Steven A. Rice and William W. Wead, entitled "Electronic Laundry Control with Fill Time Compensation", now U.S. Pat. No. 5,285,545, the entire disclosures of which are hereby expressly incorporated by reference.

The invention is disclosed herein in the context of an electronic control system for a family of commercial laundry products. In particular, the disclosed embodiment of the appliance electronic control system is applicable to each of a two-speed clothes washer, a one-speed clothes washer, an electric dryer and a gas dryer. It will be appreciated, however, that this usage is exemplary only, and that the invention is applicable to a wide variety of appliances.

In conventional laundry appliances, electro-mechanical timers are employed. In one exemplary product line, three distinct electro-mechanical timers are employed, one for the two-speed washer, one for the one-speed washer, and a common timer design shared by the electric dryer and the gas dryer.

It is highly desirable that a single controller, typically microprocessor- or microcontroller-based, be able to handle a variety of different appliances. Reasons include cost and inventory control. Volume discounts may be pursued, and inventory cost decreased. Manufacturing is greatly simplified if only one controller need be manufactured and stocked, which can then be employed in any appliance desired. Similarly, subsequent repair is greatly simplified if a service technician can carry with him a single spare controller that will operate in a variety of different appliances, rather than having to stock or possibly special order a controller for a specific appliance.

The subject invention in one aspect relates to means for easily testing the functionality of a machine. On conventional machines, the electro-mechanical timer assembly has a rotatable shaft or dial that may be manually positioned to activate particular functional elements within the machine, such as motors and solenoids, to cause a particular machine action. When such an electro-mechanical timer is replaced by an electronic controller, without a ready means of manual positioning, it is highly desirable that a means for accomplishing such functional testing be included.

From a macroscopic perspective, a clothes washing machine and a clothes dryer include functional elements such as motors, heaters and solenoids which are energized for predetermined periods of time. A complete cycle comprises several states of control outputs for activating the functional elements and which are allowed to exist for various lengths of time. There is an exception, namely water solenoids which remain activated until a full condition is detected.

In a line of commercial laundry machines, both washers and dryers have similar requirements for controller output switching devices that operate at 120 VAC. The washer requires five switching devices, two of which must have high current capabilities. The dryer requires three high current switching devices, and two low current switches. The selector switch, needed for user cycle selection, in the case of the two-speed washer has three drive lines and one sense line. In the case of the single-speed washer and both dryers, the selector switch has two drive lines and one sense line. In addition, the washing machine has two identical switches, namely a lid switch and a pressure switch for detecting water level. Certain inputs unique to a commercial laundry application, such as coin box sense, service door sense and coin input, are identical on all machines. Likewise, certain electronic components are common, such as clocks, power supplies, and the like.

One approach would be to provide a part for each controller, such as a particular printed circuit board (PCB), which is unique to the particular model.

Another approach would be to provide a controller PCB which is modifiable in either the factory or field for the particular appliance. For example, configuration jumper blocks, other forms of selectable jumpers, or encoding diodes might be provided. One common approach in providing configuration jumpers in general is to initially manufacture a PCB with jumpers or encoding diodes installed in all possible positions such that an installer can simply cut out selected ones to in effect program a particular binary code.

These approaches have drawbacks, however. In any case, additional time is required. Instructions must be provided and maintained, particularly by field service personnel. If an assembly error were to be made, the controller would attempt to operate the machine in a manner not consistent with the machine type.

SUMMARY OF THE INVENTION

It is an object of the invention to provide a flexible electronic control system which is readily reconfigurable to suit more than one machine, such as more than one laundry appliance.

It is another object of the invention to provide an appliance electronic control system which is automatically adaptable to particular ones of a plurality of different appliances.

It is another object of the invention to provide such an electronic control system which can be employed to both operate and test a machine.

It is a related object of the invention to facilitate functional tests, both on the production line and in the field, of a machine having an electronic control system.

It is a another related object of the invention to provide a testing facility which is highly flexible, which is adaptable to different appliances, and which minimizes the length of test routines in microcontroller memory.

In accordance with one aspect of the invention, an electronic control system is automatically adaptable to particular ones of a plurality of different machines such as laundry appliances. The electronic control system has a connector having common terminals for connection to any of the different wiring harnesses for the different appliances, and includes a controller having input and output lines connected to the connector terminals. Some controller output lines are connected for activating the functional elements within the appliance.

The controller includes elements for implementing appliance functions for each of the plurality of appliances by activating the functional elements in a suitable manner, and for preliminarily determining the particular appliance, for example by applying signals to particular ones of the terminals in a predetermined pattern while monitoring others of the terminals to logically recognize the particular appliance.

The appliance electronic control system of the invention includes sufficient capabilities for controlling the most complex of the target appliances, which in the example disclosed herein is a two-speed washer. In the disclosed embodiment, five output relays are employed.

It is a feature of the invention that the control uses the same hardware whether it is operating a washer or a dryer. For example, if a dryer is hooked up, a heater element is connected to a certain relay output on the control. If a washer is hooked up, the same relay in the control is hooked up to a motor. The input to the control from the lid interrupt switch switches ON/OFF if the control is hooked up to a washer, but is always OFF if the control is hooked up to a dryer. The same microprocessor RAM is utilized for the washer or dryer. Data for one is just written over the data of the other.

A communications link is connected to the controller for inputting parameters to the controller. While a wired communications link may be employed, preferably, a wireless communications link is employed, such as an optical infrared communications link. The controller includes elements for outputting signals on the output lines for activating the appliance functional elements in accordance with parameters received from the communications link.

A significant feature of the invention is the provision of an operation sequencing facility, which is herein termed an "internally restructurable control". In the context of operating a particular appliance, this internally restructurable control in general is not specific to a particular appliance. In the case of "internally restructurable control", the parameters input to the controller via the communications link comprise specifications of particular functional element states to be established in a sequence. As an example, the sequence may comprise thirteen states. The parameters additionally include specifications of time durations for selected ones of the functional element states. The "internally restructurable control mode" thus represents a general approach to machine control. A complete appliance of any type may be controlled using this approach. Moreover, a particular controller can, by programming alone, be modified to suit one appliance or another, or any set of functions for a given appliance, or one model or another of a given appliance, by changing state definitions and/or state sequences.

It may be noted that the internally restructurable control does not care what appliance it is attached to, and re-configuration is generally not involved.

In another aspect of the invention, the "internally restructurable control" is employed as a testing facility, herein termed "internal test mode" (ITM), which is accordingly a specific form of the "internally restructurable control". The "internal test mode" aspect of the invention is particularly useful for factory testing of a completed laundry appliance.

This particular aspect of the invention is based on a recognition that a functional test, when viewed from a control perspective, is a series of output states, representing different combinations of five relay outputs, for example. In the approach of the invention, sequences of output states are not necessarily included as a permanent part of the controller programming. Rather, parameters, such as test parameters, in the form of coding indicating either specific output states or particular changes in output states may be downloaded or inputted to the controller as needed via the communications link. It is an "internal test mode" embodiment of the "internally restructurable control" which is disclosed in detail hereinbelow.

Thus, in brief summary, it is a particular feature of the invention that the appliance electronic control system is operable to effect a sequence of operations of an appliance within which the electronic control system is installed in a manner which may advantageously be employed for test purposes, but which is not so limited.

In another form, referred to herein as a "diagnostic mode" to be employed primarily by field service technicians to test and determine faulty appliance functional elements, the parameters input to the controller via the communications link comprise commands to activate and deactivate particular controller outputs and thus particular functional elements within the appliance such that a service technician can establish desired operational states at will. In this mode, the parameters may be viewed as indicating particular changes in controller output states.

In the case of either the "internally restructurable control" or the "diagnostic mode" the controller is not necessarily concerned with the particular appliance. In general, states are established as commanded via the communications link.

Nevertheless, in order to prevent damage during the testing of an appliance machine which includes a motor, the controller has elements for turning the motor OFF for a predetermined pause time upon the occurrence of particular predetermined state changes. As examples, a washing machine is not permitted to switch instantly between agitate and spin modes, nor between gentle and normal agitate modes. In the event such changes in state are requested, the predetermined pause time is introduced during which the motor is stopped.

It will be appreciated that the control system and controller hardware are not specific to any particular appliance machine. As will be apparent from the detailed description hereinbelow, the hardware is such that input/output connections of the controller can connect to more than one appliance without any changes to the hardware.

Similarly, and as will also be apparent from the detailed description hereinbelow, control programs for the different possible appliances are not totally separate. Common routines are employed where possible. Moreover, a common data area in RAM memory is assigned to all possible appliances in the manner of an overlay. During the downloading of parameters, washer data and dryer data are both transmitted. However, the controller only saves the data appropriate to the particular machine.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the drawings, in which:

FIGS. 12A through 12G are a flowchart representing a clothes washer control routine.

DETAILED DESCRIPTION

Figure 1:
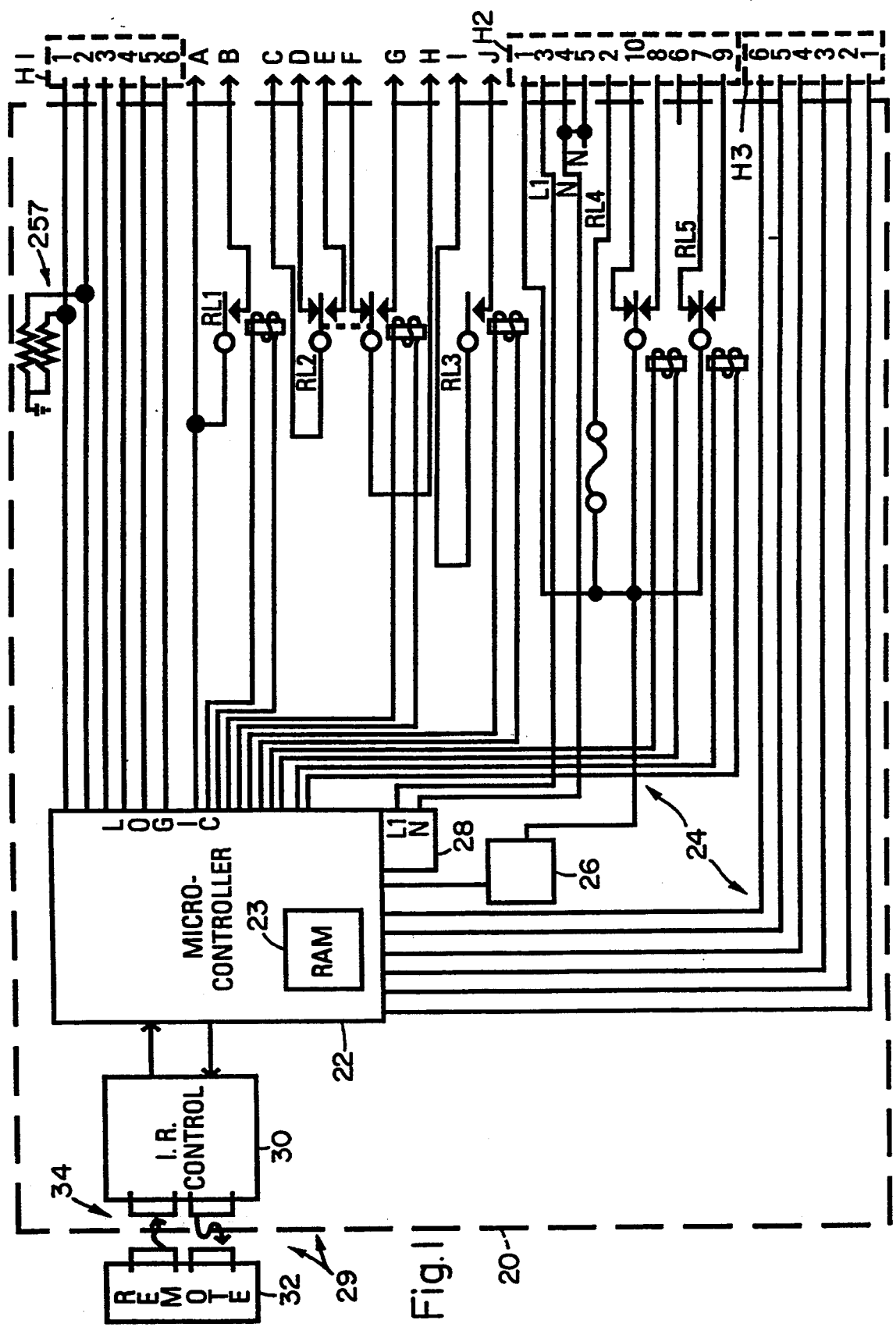
FIG. 1 is a schematic diagram of an appliance electronic control system in accordance with the invention, connected to an infrared communications link.

Referring initially to FIG. 1, an appliance electronic control system 20 includes a suitably programmed microcontroller 22, for example a Motorola 6805. Within the microcontroller 22 are memory elements 23 in the form of RAM memory, as well as ROM program memory. The microcontroller 22 includes input/output port lines, generally designated 24, which output signals for activating various appliance elements, and which receive various inputs. The electronic appliance control system 20 has several connectors, including connectors designated as H1, H2 and H3, which mate with corresponding connectors that are part of the wiring harnesses of particular machines, as is described hereinbelow with particular reference to FIGS. 2-5. Other connector terminals are designated "A" through "J". The microcontroller input/output lines 24 are connected to the outputs as shown in FIG. 1, in some cases directly, and in other cases through relays, in this case five relays respectively designated RL1, RL2, RL3, RL4 and RL5. For water level sensing in clothes washing machines, the control system 20 includes an opto-isolator 26 for interfacing 120 VAC to a microcontroller input. Although not illustrated, it will be appreciated that other appropriate interface circuitry may be employed in a conventional manner.

For powering the microcontroller 22 and other elements, a DC power supply 28 is included, which receives 120 VAC from conductors L1 and N via connector H2.

A communications link 29 is provided for, among other purposes, receiving externally generated parameter data and inputting parameters to the microcontroller 22. The communications link 29 comprises an optical infrared interface 30, which is connected to a serial communications port included as part of the 6805 microcontroller 22. The microcontroller 22 communicates via the interface 30 with a remote unit 32, for example a hand-held unit used by service technicians, over an optical communications channel 34. It will be appreciated that the communications link 29 may take a variety of forms, including a wired communications link. The optical infrared wireless communications link 29 is particularly convenient, however.

A suitable error-checking communications protocol is employed, appropriately programmed into both the remote unit 32 and the microcontroller 22. An exemplary protocol for the downloading of parameters is disclosed in the above-incorporated application Ser. No. 07/969,139.

Although not directly relevant to the present invention, it may be noted that two-way communication between the remote control unit 32 and the appliance electronic control system 20 serves a variety of other purposes, such as facilitating monitoring of the operational history of a particular machine, including the amount of money collected by a coin-operated commercial laundry machine. Thus, the remote unit 32 is a part of an auditing system which may be employed by an operator of commercial laundry establishments to monitor revenues generated by each machine. In addition, various machine operational parameters may be transmitted from the remote unit 32 to the microcontroller 22, as is also disclosed in greater detail in the above-incorporated concurrently-filed application Ser. No. 07/969,139.

Figure 2:
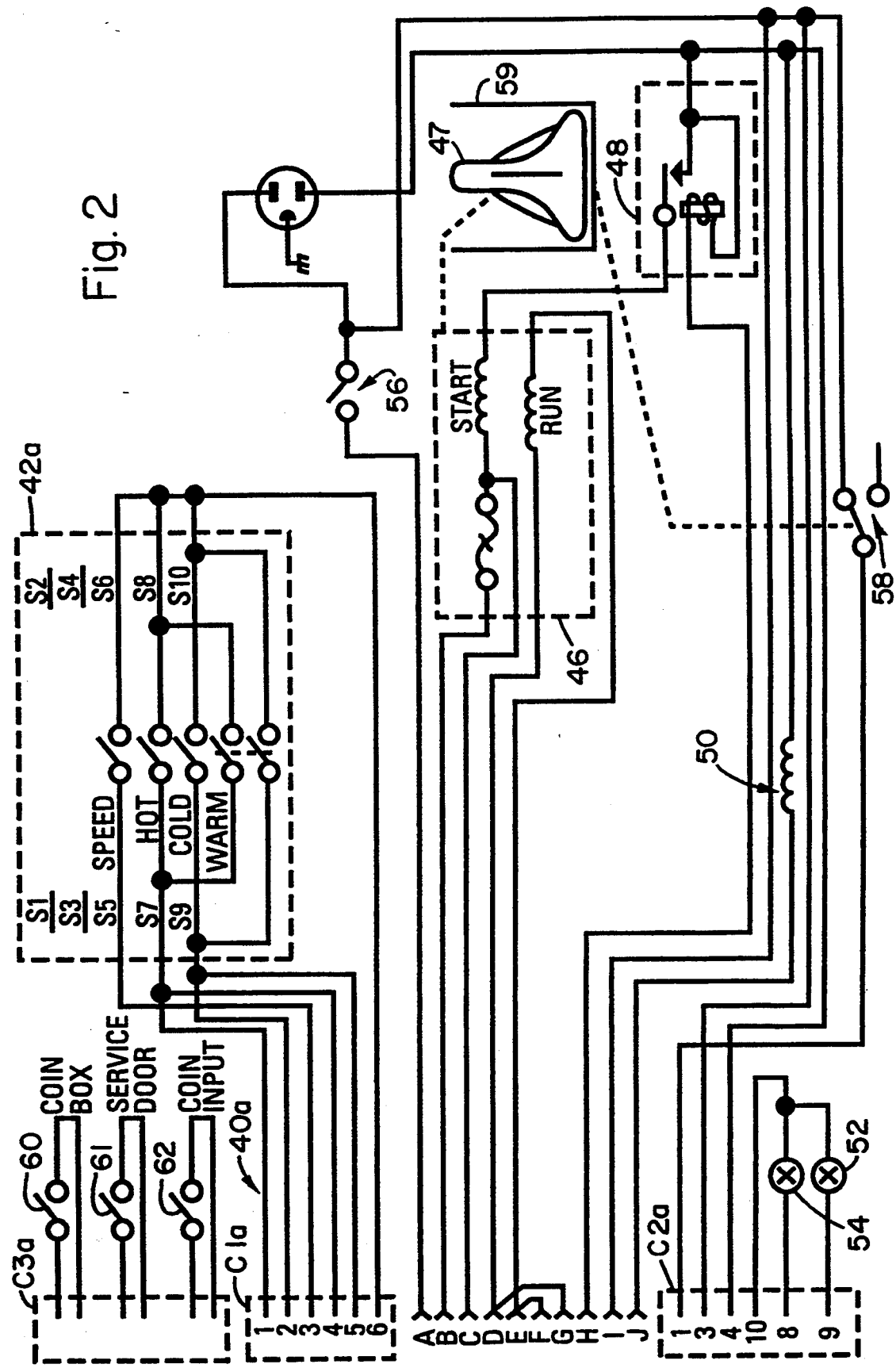
FIG. 2 is an electrical schematic diagram of the wiring harness of a two-speed washer.
Figure 3:
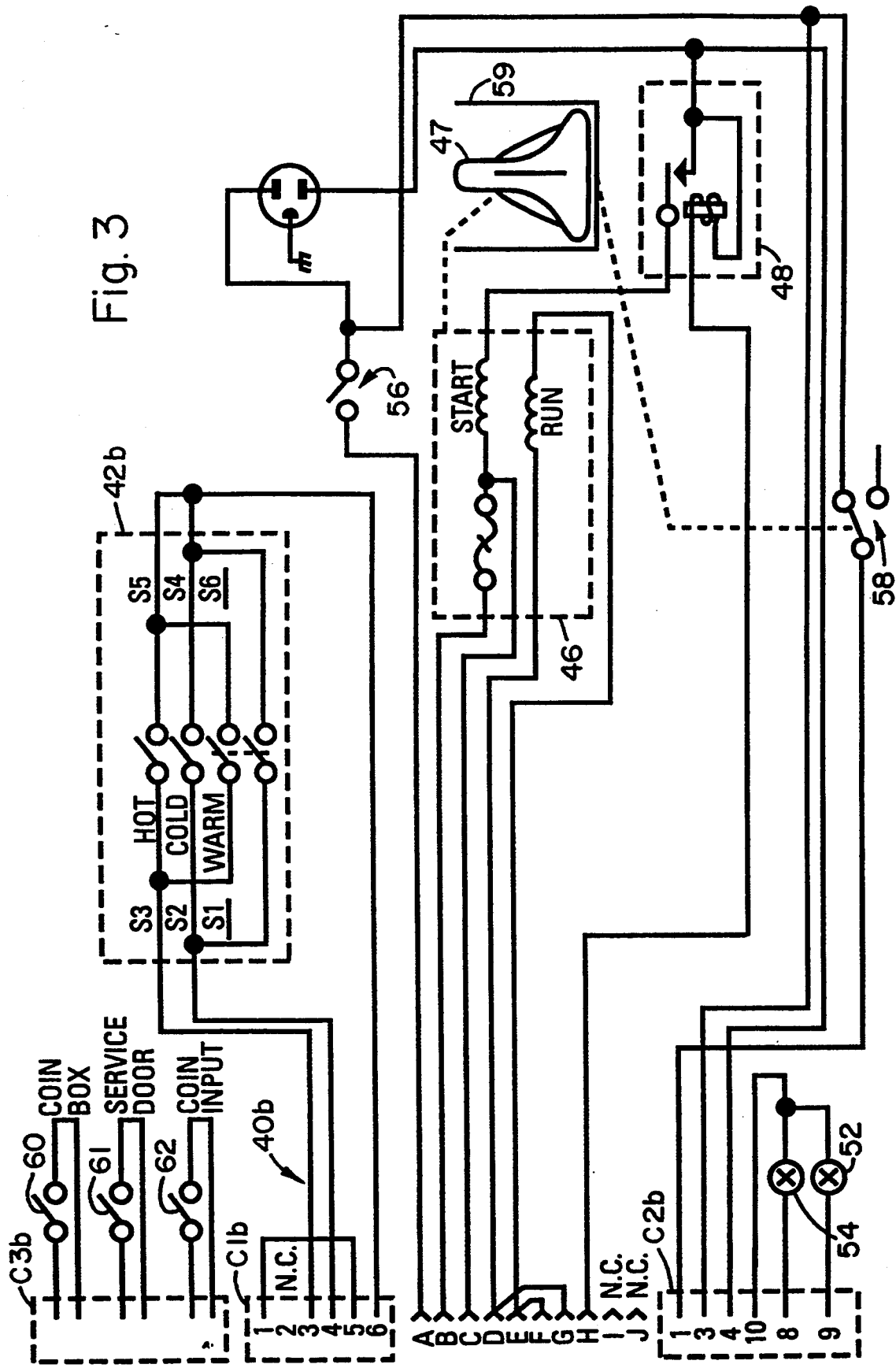
FIG. 3 is an electrical schematic diagram of the wiring harness of a one-speed washer.
Figure 4:
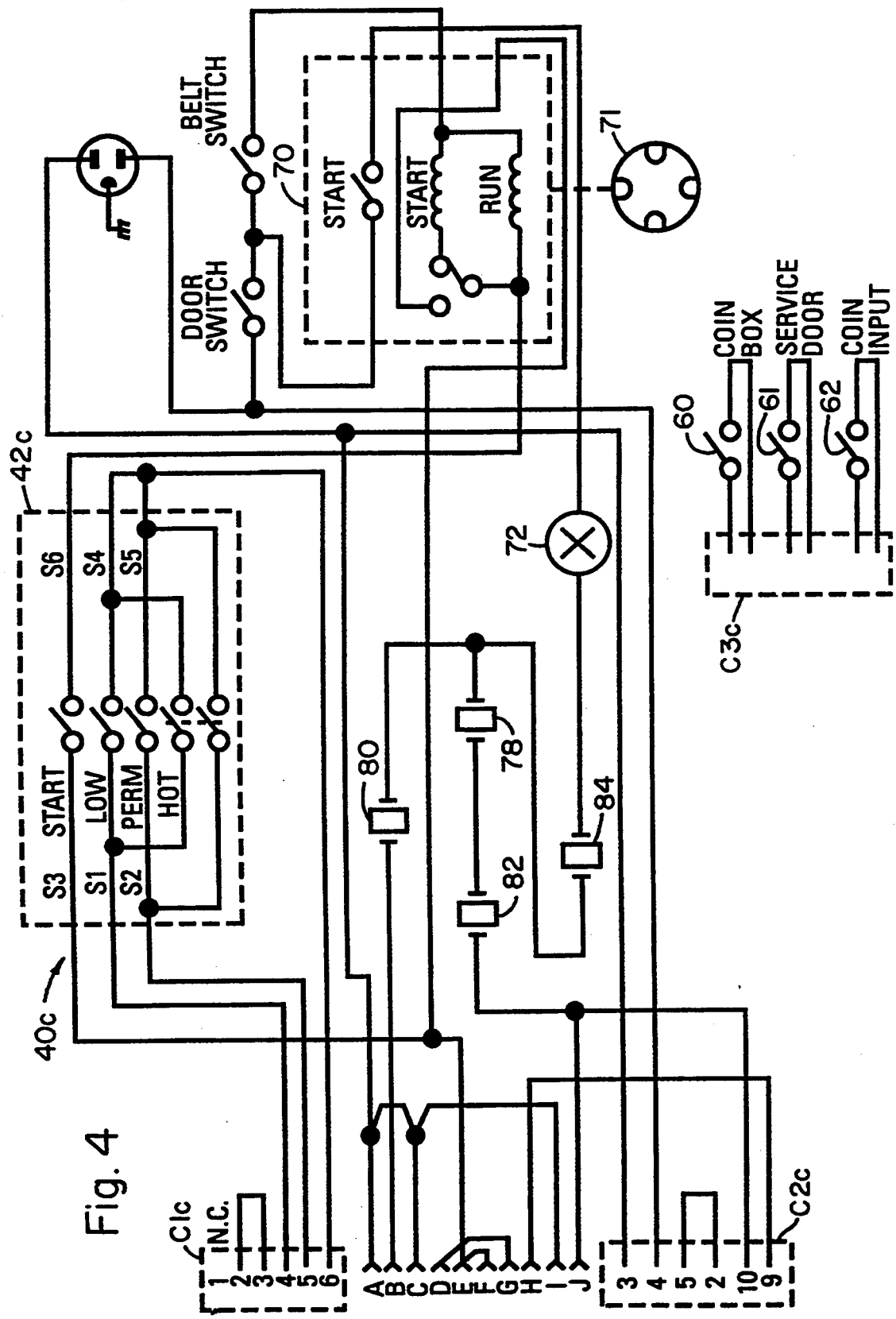
FIG. 4 is an electrical schematic diagram of the wiring harness of a gas dryer.
Figure 5:
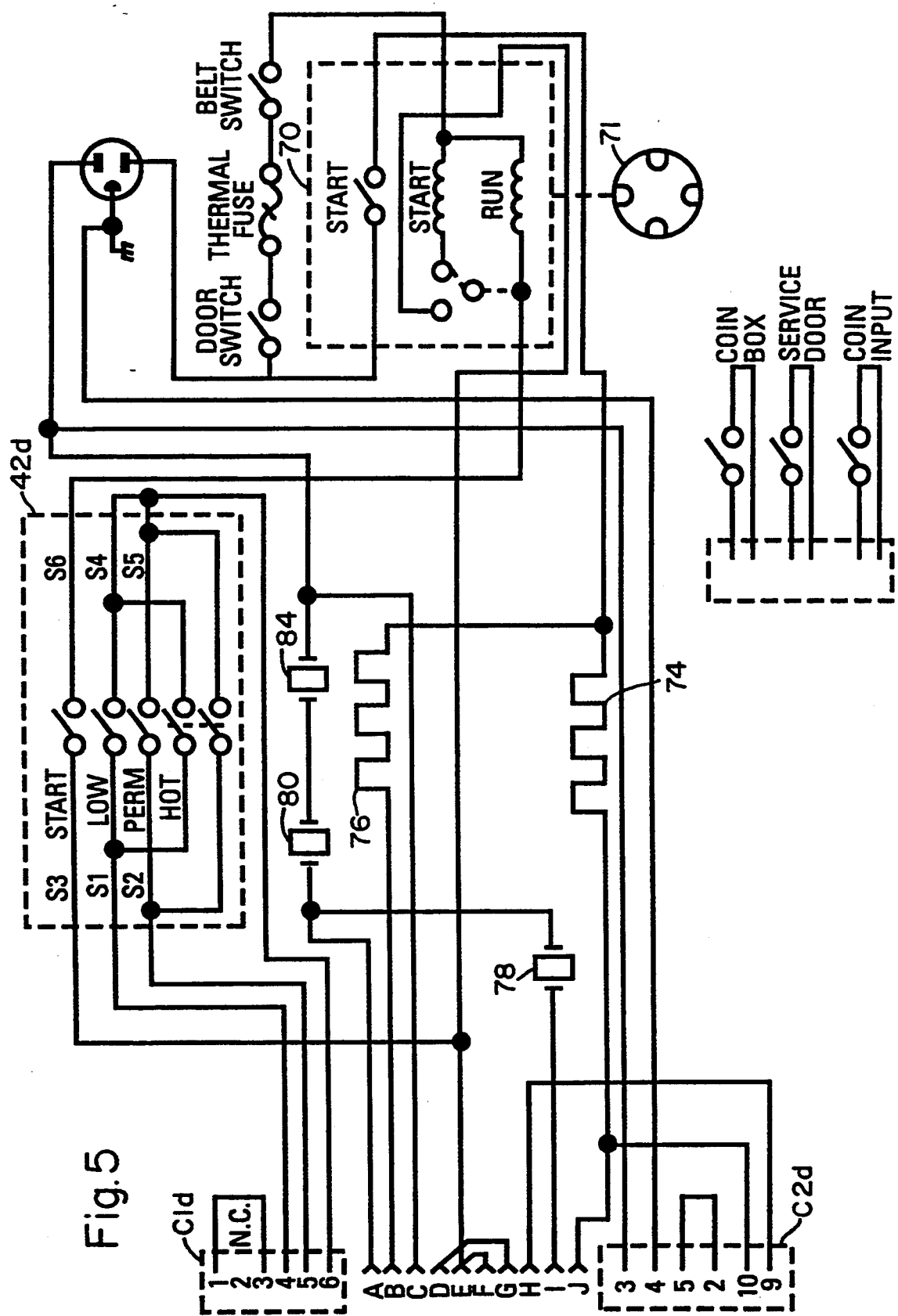
FIG. 5 is an electrical schematic diagram of the wiring harness of an electric dryer.

By way of example, FIGS. 2, 3, 4 and 5 are respective electrical schematic diagrams for four appliances, the diagrams including wiring harnesses and functional elements. FIG. 2 is a schematic diagram for a two-speed washer, FIG. 3 is a schematic diagram for a one-speed washer, FIG. 4 is a schematic diagram for a gas dryer and FIG. 5 is an electrical schematic diagram for an electric dryer.

The appliances include respective wiring harnesses 40a, 40b, 40c and 40d and respective connector sets C1a, C1b, C1c, C1d; C2a, C2b, C2c, C2d; and C3a, C3b, C3c, C3d, which mate with the FIG. 1 wiring harness connectors H1, H2 and H3, respectively. Other connector terminals are designated "A" through "J" to mate with like-designated terminals of FIG. 1. The connectors for each of the four appliances are identical but, as indicated, the particular connections differ.

In the context of the particular implementation of automatic appliance determination disclosed herein, what is particularly relevant is a user selector switch 42a, 42b, 42c or 42d connected to the control system 20 through the connector C1a, C1b, C1c or C1d. In FIG. 2, the selector switch 42a for a two-speed washer selects speed and water temperature as hot, cold or warm. In FIG. 3, the selector switch 42b for a one-speed washer merely selects water temperature as hot, cold or warm.

In FIG. 4, the selector switch 42c for a gas dryer and in FIG. 5 the selector switch 42d for an electric dryer each include a start push button and selector switches for drying temperature and cycle selection in the form of low, permanent press and hot. Since the selector switches 42c and 42d of FIGS. 4 and 5 are essentially identical, in order to distinguish between the gas and electric dryers, the wiring to the connector C1c of FIG. 4 differs from the wiring to the connector C1d of FIG. 5.

Functional elements within the washing machines include a motor 46 connected through a conventional mechanical transmission (not shown) to drive an agitator 47. The motor 46 reverses direction to effect either a spin or an agitate operation. The motor 46 is initially energized through a start relay 48, which in turn is activated by a suitable signal from the controller 20. The two-speed washer of FIG. 2 additionally includes a speed selector winding 50. Other functional elements of the clothes washers of FIGS. 2 and 3 are a cold water valve solenoid 52 and a hot water valve solenoid 54.

So that the controller 20 can monitor the status of the machine, the washers of FIGS. 2 and 3 additionally include a lid switch 56 and a water level sensor 58, appropriately connected for sensing by elements within the electronic control system 20. The water level sensor 58 responds to incoming water filling a washing machine tub 59 to a predetermined level.

Connector H3 of FIG. 1 connects to C3a, C3b, C3c and C3d to enable the controller 20 to monitor inputs related to coin operated laundry machines. Switch 60 is utilized to monitor the presence of a coin box; switch 61 indicates whether a service door is ajar; switch 62 monitors the status of a coin input. Since these are coin-operated appliances, it will be appreciated that a conventional coin box or a coin slide mechanism is also provided.

The gas and electric dryers of FIGS. 4 and 5 likewise each include a motor 70 for rotating a clothes drying drum 71. A functional element included within the gas dryer of FIG. 4 is a gas valve 72 which controls dryer heat, whereas the electric dryer of FIG. 5 includes a low electric heater 74 and a high electric heater 76. For thermostatic control of drying temperature, the dryers include "low" and "high" temperature thermostatic switches 78 and 80. The FIG. 4 gas dryer also includes an "inlet" thermostatic switch 82 electrically in series with the "low" thermostatic switch 78, and both dryers include a safety "high limit" thermostatic switch 84. Various other sensors and switches are included as indicated, all in accordance with conventional practice.

From FIGS. 1-5, it can be seen that relay RL1 controls energization of the motor 46 of the washing machines of FIGS. 2 and 3, and activates high heat in the dryers of FIGS. 4 and 5. In the gas dryer of FIG. 4, relay RL1 when activated completes a circuit through the "high" thermostatic switch 80, and in the electric dryer of FIG. 5, relay RL1 when activated completes a circuit through the high heater 76. Relay RL2 controls motor direction (reset for agitate and set for spin) in the washing machines of FIGS. 2 and 3, and controls energization of the motor 70 of the dryers of FIGS. 4 and 5. Relay RL3 controls motor speed in the two-speed washer of FIG. 2, is unused in the case of the one-speed washer of FIG. 3, and activates low heat in the dryers of FIGS. 4 and 5. In the gas dryer of FIG. 4, relay RL3 when activated completes a circuit through the "low" thermostatic switch 78, and in the electric dryer of FIG. 5, relay RL3 when activated completes a circuit through the low heater 74. Relay RL4 controls energization of the hot water solenoid 54 in the washers of FIGS. 2 and 3, and completes a test circuit when not activated in the case of the dryers of FIGS. 4 and 5. Similarly, relay RL5 controls energization of the cold water solenoid 56 in the washers of FIGS. 2 and 3, and completes another test circuit when not activated in the case of the dryers of FIGS. 4 and 5.

Figure 6:
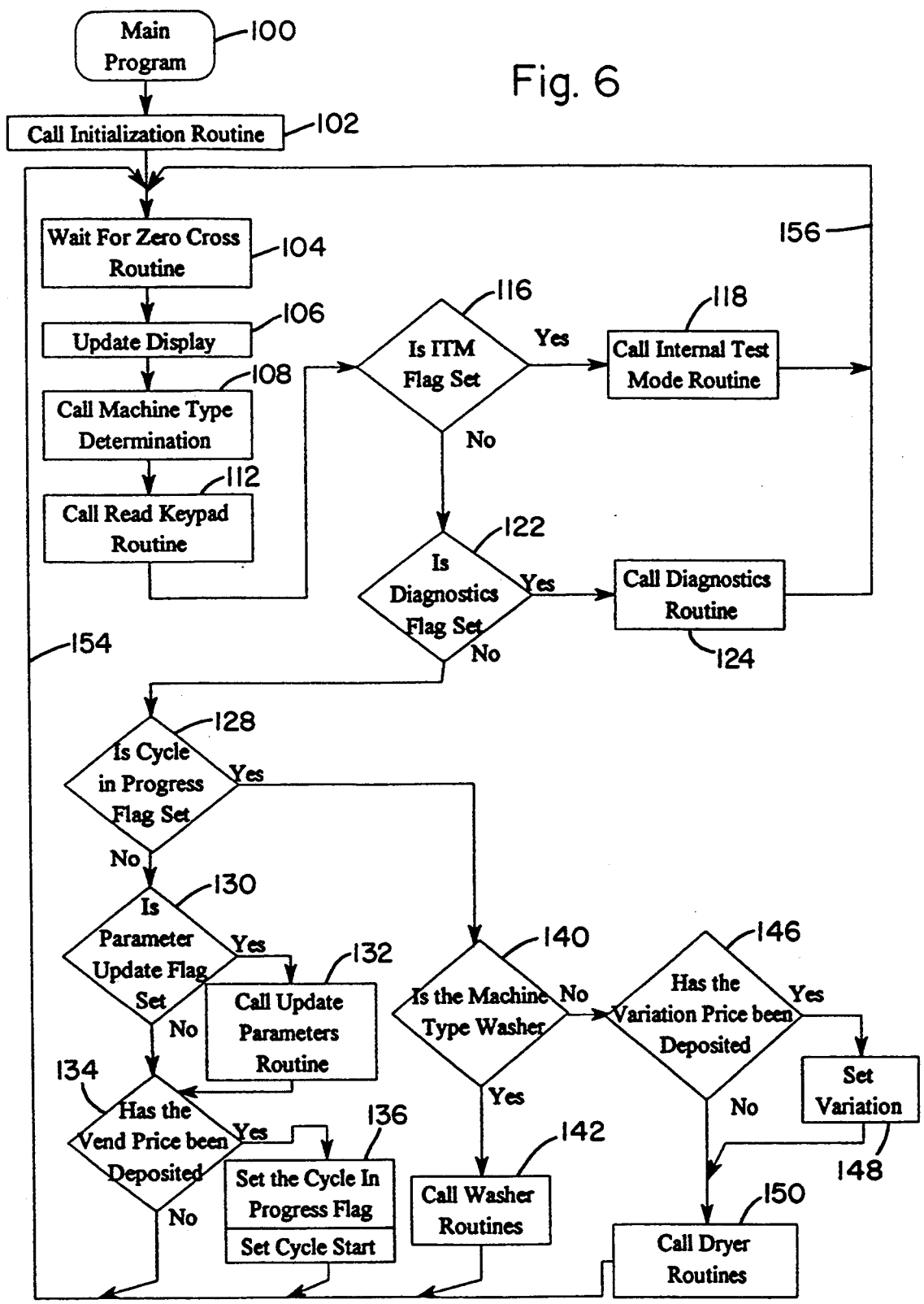
FIG. 6 is a flowchart representing the top level of a main control program.
Figure 7:
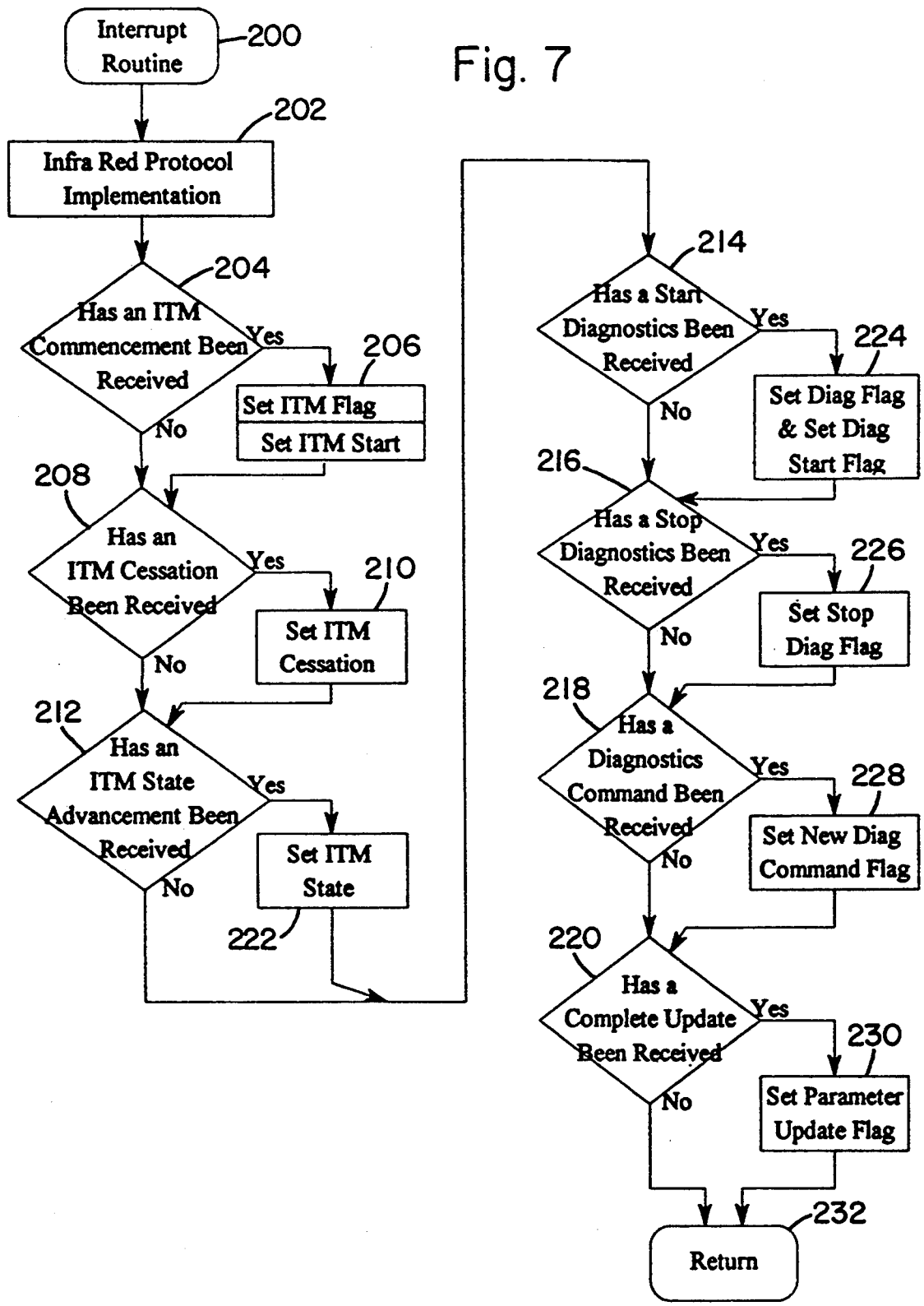
FIG. 7 is a flowchart representing an interrupt routine to process communications via an infrared serial communications link.

Considering now exemplary programming within the microcontroller 22, FIG. 6 is a flow chart showing the overall structure of a control program, identified as Main Program; and FIG. 7 is a flowchart of an Interrupt Routine which services the FIG. 1 infrared control interface 30, identified as Interrupt Routine. The microcontroller 22 is programmed such that an interrupt is generated each time a valid data byte is received from the remote unit 32 over the communications channel 34. The FIG. 7 interrupt service routine communicates with the FIG. 6 main program by setting various flags in memory, which are tested at various points during execution of the FIG. 6 main program. The FIG. 6 main control program and the FIG. 7 interrupt service routine proceed more or less independently, communicating with each other through the various flags set in memory. In essence, the microcontroller 22 is running two programs.

The Main Program of FIG. 6 is entered in Box 100. Execution proceeds to Box 102, where an Initialization Routine is called to initialize the microcontroller 22 system in a conventional manner.

Thereafter, a program main loop is entered which begins with a Zero Cross Routine in Box 104. The program waits in the Box 104 Zero Cross Routine until a zero crossing of the AC power line is detected. (With a 60 AC power line frequency, zero crossings occur one hundred twenty times per second.) The entire program main loop, including called routines as described hereinbelow, executes in less than 1/120 second, whereupon execution returns to Box 104 to wait for the next zero crossing.

When a zero crossing is detected, an Update Display Routine is called in Box 106, which updates an associated user display (not shown) to indicate the status of the machine, in a manner not particularly relevant to the present invention.

Next, in Box 108, a Machine Type Determination routine 110 is called, described in detail hereinbelow with particular reference to FIG. 8. The Machine Type Determination routine 110 logically determines the particular appliance by causing signals to be applied to particular ones of the terminals of the wiring harness connector H1, and thus C1a, C1b, C1c or C1d, in a predetermined pattern, while monitoring others of the terminals to logically recognize a wiring harness indicating a particular appliance. In accordance with the particular organization of the Main Program flow chart of FIG. 6, the Machine Type Determination routine is executed one hundred twenty times per second, even though the particular appliance does not change, and sets an appropriate software flag indicating the particular appliance each time it is executed.

The FIG. 6 Main Program then continues in Box 112 with a call to a Read Keypad routine 114, described hereinbelow with reference to FIGS. 9A and 9B, where the microcontroller 22 determines the state of the selector switch 42a, 42b, 42c or 42d in order to determine the user's selections. The Read Keypad routine is the first of several machine-specific routines which take into account the machine as determined by the Machine Type Determination Routine 110 called in Box 108.

Next, in decision Box 116, an Internal Test Mode (ITM) flag is tested to see whether execution should pass to Box 118 which calls an Internal Test Mode routine 120 described hereinbelow with reference to FIGS. 10A and 10B. As noted hereinabove under the heading "Summary of the Invention", the Internal Test Mode routine 120 is a specific implementation of an "internally restructurable control", and is employed primarily as a factory functional test following assembly of a machine. The ITM Flag is set or not by the FIG. 7 interrupt service routine based on commands received from the remote unit 32 over the infrared communication channel 34.

If the answer in decision Box 116 is "no" then in decision Box 122 a Diagnostics Flag is tested and, if set, execution proceeds to Box 124 where the Diagnostics routine 126 of FIGS. 11A through 11D is called. The Diagnostics Routine 126 is intended to be employed primarily by field service technicians to exercise functional elements of an appliance for repair purposes. The Diagnostics Flag likewise is set or not by the FIG. 7 interrupt service routine upon command from the remote unit 32.

If the Diagnostics Flag is not set, then execution proceeds to decision Box 128 where a Cycle In Progress Flag is tested. One of the purposes of testing the Cycle In Progress Flag in Box 128 is to ensure that parameters are not updated during a machine cycle. The Cycle In Progress Flag is initially clear so that, at least the first time the FIG. 6 main program is executed, execution passes to decision Box 130 where a Parameter Update Flag is tested and, if set, execution proceeds to Box 132 where an Update Parameters routine is called. The Parameter Update Flag is another flag which is set or not by the FIG. 7 interrupt service routine based on instructions received over the communications channel 34. The subject invention is not concerned with the updating of parameters, and so the Update Parameters routine is not described in detail herein. Reference may be had however to the above-incorporated concurrently-filed application Ser. No. 07/969,139 entitled "Appliance Electronic Control System with Programmable Parameters Including Programmable and Reconfigurable Fuzzy Logic Controller" for further details.

In decision Box 134 the state of an appropriate line of the FIG. 1 connector H3 is tested to determine whether the appropriate amount of money has been deposited. If not, execution loops back to the Zero Cross Routine 104. If the price has been deposited, then execution proceeds to Box 136 where the Cycle in Progress Flag is set, to be subsequently tested in decision Box 128 the next time the FIG. 6 routine is executed, and a Cycle Start flag is set.

Thus, upon the next zero crossing, program execution proceeds from Box 104 through procedures and tests as described above, to decision Box 128, where the Cycle In Progress Flag is found to be set. At this point, decision Box 140 is entered which tests a flag from the Machine Type Determination routine to see whether the machine type is a washer. If the answer is yes, then execution proceeds to Box 142 which calls a Washer Routine 144, represented by the flowcharts of FIGS. 12A through 12G, described hereinbelow.

If the answer in decision Box 140 is no, then it is assumed the machine is a dryer, and decision Box 146 is entered which checks to see whether the user has, within the last 1/120 second, inserted an additional coin for an additional dryer time, known as variation price, and, if so, in Box 148 a Variation Flag is set. In either event, execution then proceeds to Box 150, which calls a Dryer Routine 152, represented by the flowcharts of FIGS. 13A and 13B, described hereinbelow.

Again, the entire set of routines executes quickly, in less than 1/120 of a second, and the Main Program loops via flowchart path 154 or 156 back to the Zero Cross Routine of Box 104 to wait for the next zero crossing of the AC power line.

Referring now to FIG. 7, the interrupt service routine is designated Interrupt Routine 200, and is responsible for receiving information from the FIG. 1 remote unit 32 via the infrared communications channel 34 and the control interface 30. When a data byte has been received, the interface 30 asserts a processor interrupt, whereupon the Interrupt Routine 200 is entered.

In Box 202 a suitable protocol is implemented to assemble sequences of data and ensure that valid data bytes are being communicated.

In decision Box 204, data received from the communications channel 34 and processed in Box 202 is examined to see whether a command to commence the Internal Test Mode has been received. If the answer is yes, then in Box 206 an ITM Flag and an ITM Start Flag are set.

Similarly, in decision Box 208, data from the communications channel 34 is examined to determine whether a command to cease the internal test mode has been received and, if so, in Box 210 an ITM Cessation Flag is set.

Execution proceeds as indicated in the FIG. 7 flowchart through a series decision Boxes 212, 214, 216, 218 and 220 in which data from the communications channel 34 is examined to determine whether various flags should be set or not, as indicated in respective Boxes 222, 224, 226, 228 and 230. Finally, a Return from the FIG. 7 Interrupt Routine 200 is executed in Box 232.

Figure 8:
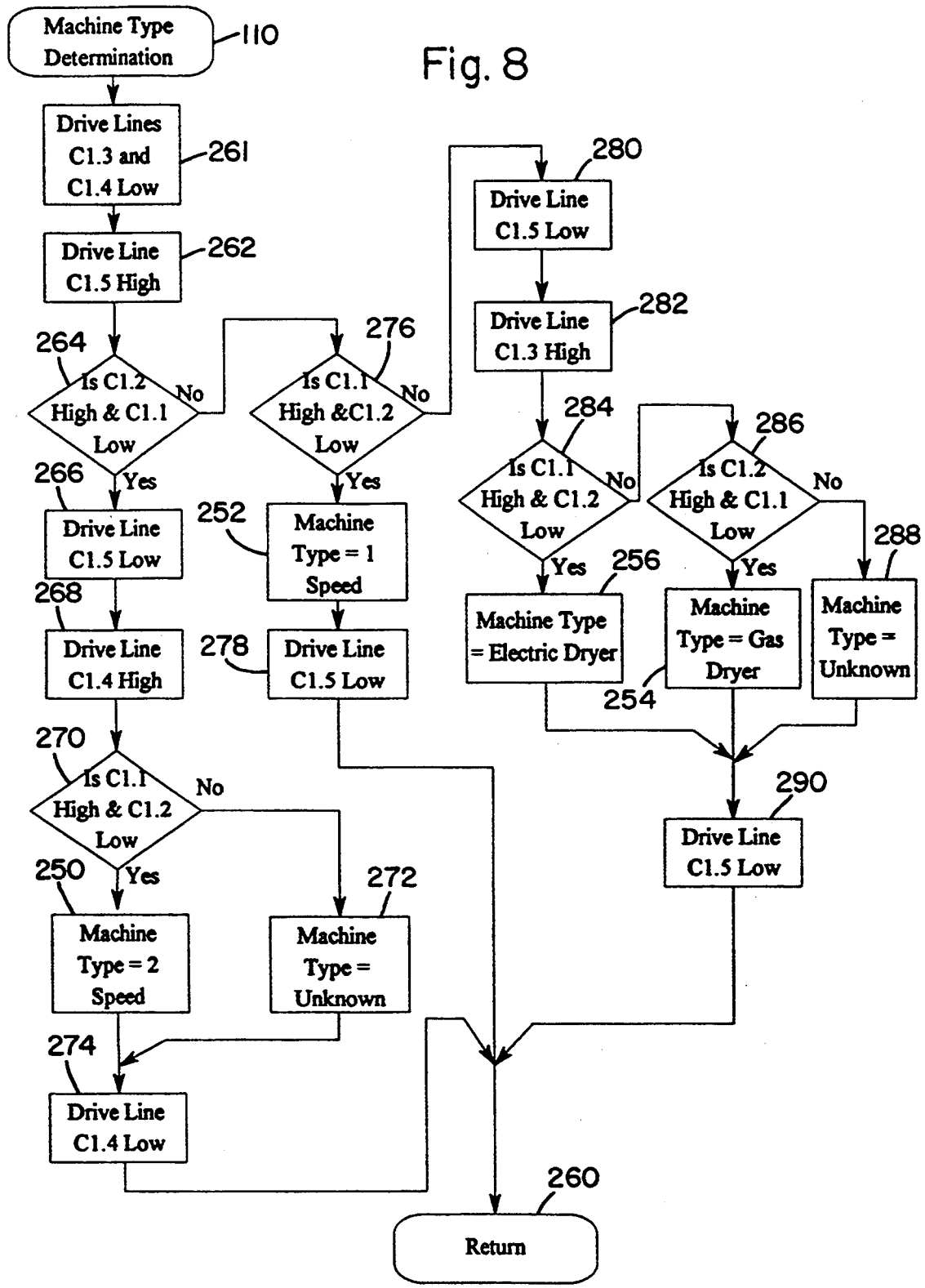
FIG. 8 is a flowchart representing a routine to determine a particular appliance.

Referring now to FIG. 8, the Machine Type Determination routine 110, called by FIG. 6 Box 108, serves to determine a particular appliance by recognizing which one of the particular wiring harnesses 40a, 40b, 40c or 40d of FIGS. 2 through 5, and thus the particular machine type and machine, is connected to the FIG. 1 connector Hi. It may be noted that the connectors C1a, C1b, C1c and C1d of the respective wiring harnesses 40a, 40b, 40c and 40d each have six terminals connected to lines of the respective harness, and these are collectively referred to in the flowchart of FIG. 8 employing the nomenclature C1.1, C1.2, C1.3, C1.4, C1.5 and C1.6. The FIG. 8 Machine Type Determination Routine does not know in advance which of the wiring harness connectors C1a, C1b, C1c or C1d is in use. Thus line C1.1, for example, refers to line 1 of whichever of the connectors C1a, C1b, C1c or C1d is in use, depending on the particular appliance.

By following the logic of the FIG. 8 flowchart, with reference to FIGS. 2-5, it will be seen that the particular appliance is logically determined. As a result, if the appliance is a two-speed washer, then an appropriate flag is set in Box 250. If the appliance is a one-speed washer, then an appropriate flag is set in Box 252. If the appliance is logically determined to be a gas dryer, then an appropriate flag is set in Box 254. If the appliance is logically determined to be an electric dryer, then an appropriate flag is set in Box 256.

More particularly, lines C1.3, C1.4 and C1.5 serve as drive lines for Machine Type Determination and lines C1.1 and C1.2 are pulled to a low logic level by a pull down resistor network 257 and serve as sense lines for Machine Type Determination. Lines C1.3 and C1.4 are driven low and line C1.5 is driven high at Boxes 261 and 262. The status of the two input lines are determined at decision block 264. If the harness of a two speed washer is connected to H1, execution continues with Box 266; otherwise, if the wiring harness of a single speed washer, gas dryer or electric dryer is connected to H1, execution continues with decision Box 276. Line C1.5 is driven low at Box 266 and line C1.4 is driven high at Box 268 while line C1.3 remains low to uniquely identify the wiring harness as belonging to a two speed washer. The status of the input lines is again checked at decision Box 270 and, if C1.1 is high and C1.2 is low, the machine type is set as a two speed washer at Box 250. Otherwise, the machine type is set to unknown at Box 272 to indicate an error. Drive line C1.4 is set to the inactive state at Box 274 following both Boxes 250 and 272.

If the wiring harness is determined to not belong to a two speed washer at decision Box 264, the input lines are compared against the configuration for a single speed washer at decision Box 276. If the conditions are met, the machine type is set as a single speed washer at Box 252. In a manner similar to Box 274, the active drive line, C1.5, is reset to the inactive state at Box 278 prior to exiting the routine at block 260.

If decision Boxes 264 and 276 have determined that the wiring harness is not that of a two speed washer or a single speed washer, then the remaining options are gas dryer, electric dryer, or unknown. Drive line C1.5 is driven low at Box 280 and drive line C1.3 is driven high at Box 282, while drive line C1.4 remains low. The correct input line status for an electric dryer given these drive line conditions is tested at decision Box 284. If the input conditions are met, the machine type is set as an electric dryer at block 256, if the input conditions are not met, the input conditions for a gas dryer are tested at decision Box 286. If the conditions of decision Box 286 are met, the machine type is set as a gas dryer at Box 254; otherwise, the machine type is set to unknown at Box 288. Boxes 256, 254 and 288 continue execution with Box 290 which resets the active drive line, C1.5 prior to exiting the routine at Box 260 and returning to the FIG. 6 routine.

Figure 9A:
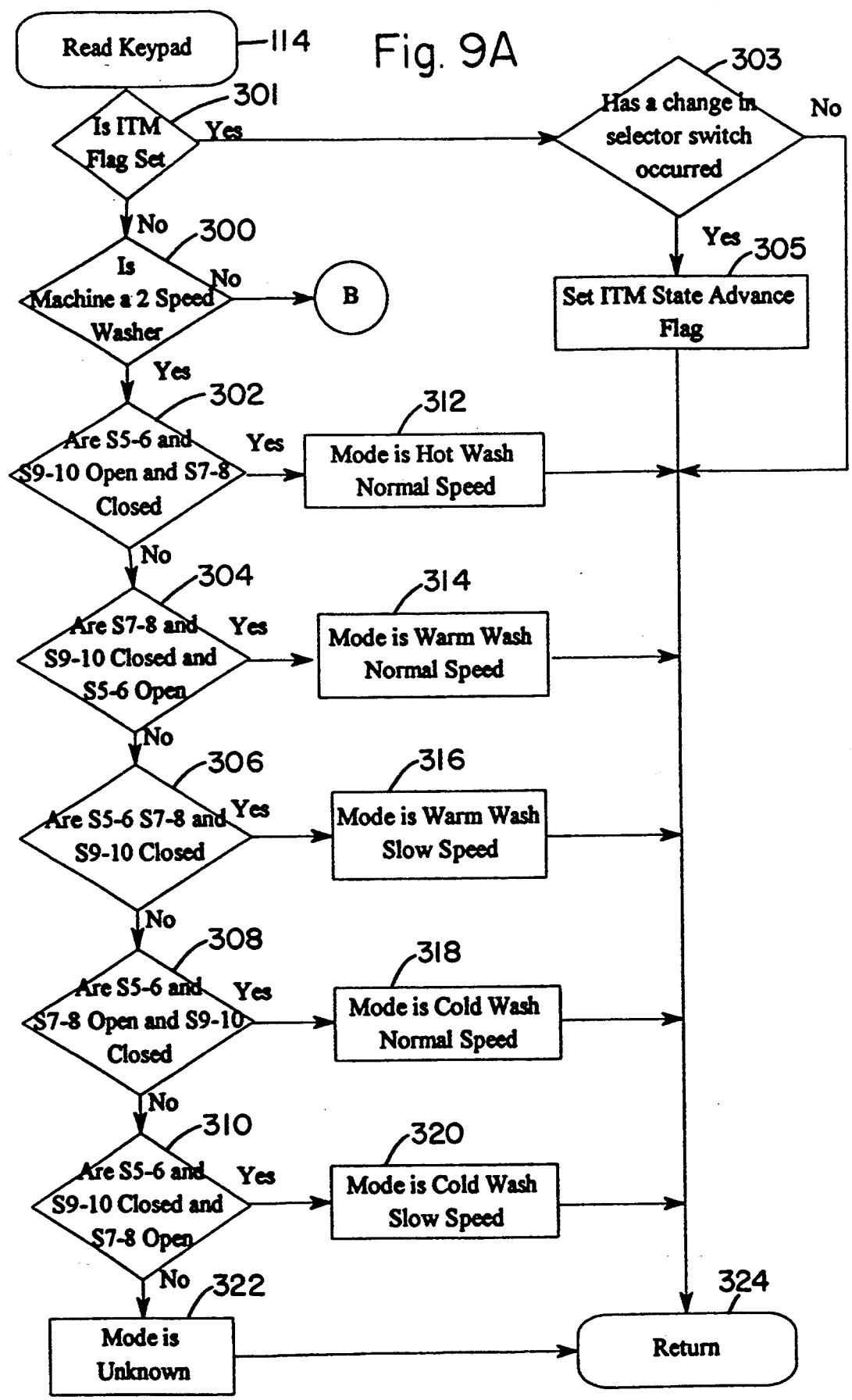
FIGS. 9A and 9B are a flowchart representing a routine to read user selector switches in view of the particular appliance determination.
Figure 9B:
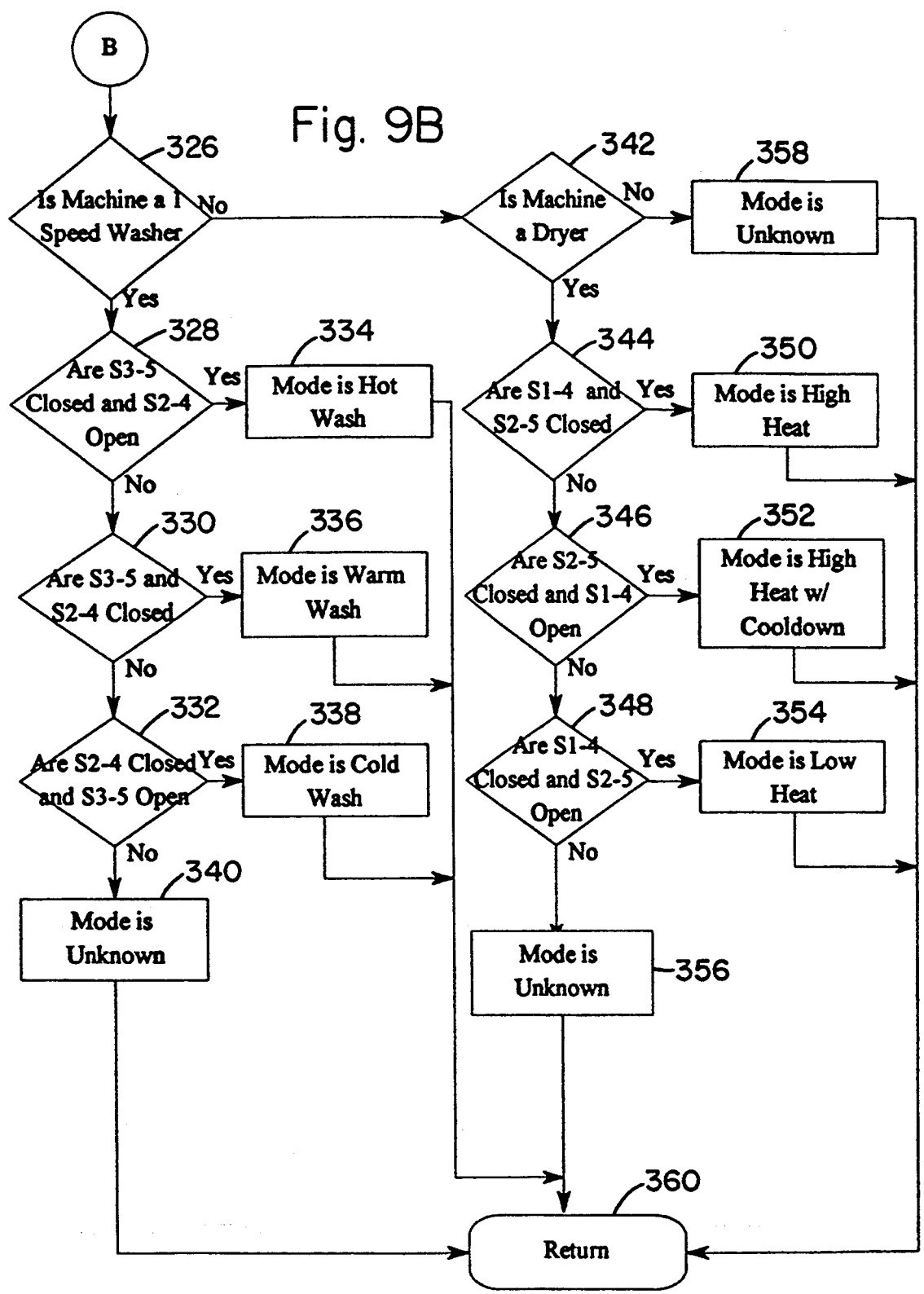

Upon return to the FIG. 6 Main Program, execution continues with Box 112, where the Read Keypad routine 114 of FIGS. 9A and 9B is called. The purpose of the Read Keypad routine 114 is to interpret the user setting of the selector switch 42a, 42b, 42c or 42d in the context of the particular appliance and to provide a means of input to the Internal Test Mode. The Read Keypad routine 114 accordingly takes into account the particular appliance as determined by the FIG. 8 Machine Type Determination Routine.

Thus, and in reference to FIG. 9A, it is determined whether the Internal Test Mode is active in decision Box 301. If the Internal Test Mode is active, it is determined in decision Box 303 whether the state of the selector switch 42a, 42b, 42c or 42d has changed since the last pass through the routine. If a change in selector switch status has occurred, a state change of the Internal Test Mode is required, as is explained in detail hereinbelow with reference to FIGS. 10A and 10B, and the ITM State Advance Flag is set in Box 305. The FIG. 9A routine then exits in Box 324, and execution returns to the FIG. 6 routine.

If it is determined that the Internal Test Mode is not active, a decision is made in Box 300 based on the machine type as determined by the Machine Type Determination Routine 110 of FIG. 8. If the machine was determined to be a two-speed washer, then execution proceeds to a series of decision Boxes 302, 304, 306, 308 and 310 which logically test the states of the various switches of the FIG. 2 selector switch 42a. The tests in decision Boxes 302, 304, 306, 308 and 310 are logically based on the assumption that the particular appliance is a two-speed washer, and result in one of the Boxes 312, 314, 316, 318 or 320 being entered to set an appropriate washer mode flag. Due to malfunction or improper connection, there is the possibility that no valid mode is recognized, in which case an unknown mode flag is set in Box 322. In Box 324, execution returns to the FIG. 6 Main Program which called the Read Keypad routine 114.

If the decision in Box 300 is that the previously-determined machine type is not a two-speed washer, then execution proceeds to FIG. 9B where a decision is made depending on whether the machine is a one-speed washer. If so, the series of decision Boxes 328, 330 and 332 logically test the state of the various switches of the FIG. 3 selector switch 42b, based on the assumption that the particular appliance is a one-speed washer, resulting in one of the Boxes 334, 336, 338 or 340 being entered to set an appropriate washer mode flag.

If in Box 326 the decision is that the machine is not a one-speed washer, then decision Box 342 verifies that the machine is in fact a dryer, whereupon decision Boxes 344, 346 and 348 logically test the states of the various switches of either the FIG. 4 selector switch 42c or the FIG. 5 selector switch 42d. There is no distinction between a gas dryer and an electric dryer in this regard. One of the Boxes 350, 352, 354 and 356 accordingly is entered to set an appropriate dryer mode flag. If Box 342 determines the machine is not a dryer, then Box 358 sets the unknown mode flag. In any event, a return to the main program is executed in Box 360.

Considering the diagnostic aspects of the invention in particular, once a single control is designed to operate four different laundry appliances, means must be included to test functionality appropriate to the particular appliance. Following initial factory assembly, appliances undergo a functional test to verify the operation of each machine. It could also be desirable to exercise each machine through a functionality test during field service. Individual routines, one for each type of laundry machine, could be included in the software, but this would lead to unnecessary code of duplication and, moreover, would fix the functionality test in a manner such that it could not readily be changed.

A functionality test may be viewed as a series of output states. Since there are only five relay outputs, the operating state of a laundry machine may be defined by five bits. A complete wash cycle, for example, consists of only eight of these states.

In accordance with the invention, an internal test mode is provided which consists of a plurality of these functional states, for example, thirteen. During the internal test mode, each state persists until the control is commanded to advance a state. This may be accomplished by a change in selector switch status, by a command over the infrared communications link, or by a timer function.

In one particular implementation of the invention, each state is represented as a single eight-bit byte. Five bits are used for relay states, one bit is used for an annunciator, and the remaining two bits are used to select a timing function. If neither of the two timing bits are set, then no timer function exists for the state definition. However, if any combination of the two timer bits are set, this refers to one of three eight-bit timing functions. These timing functions operate in seconds, and may be programmed to operate from one to 255 seconds. If a state has a timer function assigned to it, when the state has persisted for that length of time, the appliance advances to the next state of the internal test mode. If no timer function is selected, the state persists until either a change in the selector switch status occurs, or a state advance command is issued over the communications link. If a timer function is being utilized, and a change in the status of selector switch 42a, 42b, 42c or 42d occurs or a state advance command is issued over the communications link, the state advance occurs immediately. The state advance is contingent upon the detection of any one of the three state advance conditions: the timer counting down to zero, the selector switch changing status, or the reception of a state advance command. To allow for continuous testing, upon completion of the thirteenth state, the appliance restarts the test with the first state.

The particular bit assignments are as defined in the following TABLE I:

TABLE I

| Bit 7 | Timer High |
| Bit 6 | Timer Low |
| Bit 5 | Relay 5 |
| Bit 4 | Relay 4 |
| Bit 3 | Relay 3 |
| Bit 2 | Relay 2 |
| Bit 1 | Relay 1 |
| Bit 0 | Annunciator |

The timer values and the state definitions are transferred to the electronic control system from the remote unit 32 via the infrared communications link 34.

By way of more particular example, the Internal Test Mode of the electronic control system may be used to implement a normal machine cycle with reduced times. The normal cycle of the two-speed washer, the most complicated of the four laundry machines, may be broken down into eight distinct phases. These phases are:
1) Fill
2) Wash Agitate
3) Spin
4) Spin with Spray
5) Spin
6) Fill
7) Rinse Agitate
8) Spin.

In this example, the state advancement timing functions are set as follows: Timer 1 = 1 minute, Timer 2 = 2 minutes, and Timer 3 = 4.25 minutes. To implement these timing function values, the eight-bit timing function bytes are set as indicated in the following TABLE II:

TABLE II

| | \multicolumn{8}{c}{Bit} | |
|---|---|---|---|---|---|---|---|---|---|
| | 7 | 6 | 5 | 4 | 3 | 2 | 1 | 0 | |
| Timer 1 | 0 | 0 | 1 | 1 | 1 | 1 | 0 | 0 | 60 seconds = 1 minute |
| Timer 2 | 0 | 1 | 1 | 1 | 1 | 0 | 0 | 0 | 120 seconds = 2 minutes |
| Timer 3 | 1 | 1 | 1 | 1 | 1 | 1 | 1 | 1 | 255 seconds = 4.25 minutes |

To implement a normal two-speed machine cycle with gentle agitate and warm water wash and rinse, state definitions of the following TABLE III may be set up:

TABLE III

| | \multicolumn{8}{c}{Bit} | |
|---|---|---|---|---|---|---|---|---|---|
| State | 7 | 6 | 5 | 4 | 3 | 2 | 1 | 0 | |
| 1 | 1 | 1 | 1 | 1 | 0 | 0 | 0 | 0 | 4.25 minute warm fill |
| 2 | 1 | 1 | 0 | 0 | 1 | 0 | 1 | 0 | 4.25 minute gentle wash agitation |
| 3 | 1 | 0 | 0 | 0 | 0 | 1 | 1 | 0 | 2 minute spin |
| 4 | 0 | 1 | 1 | 1 | 0 | 1 | 1 | 0 | 1 minute spin with warm spray |
| 5 | 1 | 0 | 0 | 0 | 0 | 1 | 1 | 0 | 2 minute spin |
| 6 | 1 | 1 | 1 | 1 | 0 | 0 | 0 | 0 | 4.25 minute warm fill |
| 7 | 1 | 1 | 0 | 0 | 1 | 0 | 1 | 0 | 4.25 minute gentle rinse agitation |
| 8 | 1 | 1 | 0 | 0 | 0 | 1 | 1 | 0 | 4.25 minute spin |

The internal test mode may be used to implement abnormal cycles as long as the cycle description is no more than thirteen states. An abnormal cycle may be used for testing in the factory or implementing a special purpose cycle. An example of such an abnormal cycle is defined in the following TABLE IV:

TABLE IV

| | \multicolumn{8}{c}{Bit} | |
|---|---|---|---|---|---|---|---|---|---|
| State | 7 | 6 | 5 | 4 | 3 | 2 | 1 | 0 | |
| 1 | 1 | 1 | 0 | 0 | 0 | 1 | 1 | 0 | 4.25 minute spin |
| 2 | 0 | 1 | 0 | 0 | 1 | 0 | 1 | 0 | 1 minute gentle agitate |
| 3 | 0 | 1 | 0 | 0 | 0 | 0 | 1 | 0 | 1 minute normal agitate |
| 4 | 1 | 1 | 1 | 1 | 0 | 0 | 0 | 0 | 4.25 minute warm fill |
| 5 | 1 | 0 | 0 | 0 | 0 | 0 | 0 | 0 | 2 minute soak |
| 6 | 1 | 0 | 0 | 0 | 0 | 1 | 1 | 0 | 2 minute spin |
| 7 | 0 | 1 | 1 | 0 | 0 | 0 | 0 | 0 | 1 minute cold fill |
| 8 | 0 | 0 | 0 | 0 | 1 | 0 | 1 | 0 | gentle agitate of indeterminate length |
| 9 | 1 | 0 | 0 | 1 | 0 | 0 | 1 | 0 | 2 minute normal agitate with hot fill |
| 10 | 1 | 1 | 0 | 0 | 0 | 0 | 0 | 0 | 4.25 minute soak |
| 11 | 0 | 1 | 0 | 0 | 0 | 1 | 1 | 0 | 1 minute spin |
| 12 | 0 | 1 | 0 | 0 | 1 | 0 | 1 | 0 | 1 minute gentle agitate |
| 13 | 1 | 1 | 0 | 0 | 0 | 1 | 1 | 0 | 4.25 minute spin |

While the cycle of TABLE IV makes little sense from an operational viewpoint, it is representative of cycle definitions which may be achieved for testing of an appliance.

The Internal Test Mode Routine 120 itself will now be briefly described with reference to FIGS. 10A and 10B. It will be appreciated that the flowcharts of FIGS. 10A and 10B are exemplary only, as there are a variety of ways in which the internal test mode may be implemented. Moreover, as noted hereinabove, the so-called "Internal Test Mode" is not limited to testing, and thus has broader application as a general approach to machine control. A particular controller can, by programming alone, be modified to suit one appliance or another.

As noted above with reference to FIG. 6, the Internal Test Mode Routine 120 is called from Box 118 when the ITM flag is found to be set in decision Box 116. The ITM flag 206 is set or not by the FIG. 7 interrupt routine 200, based on commands from the remote unit 32 via the communications link 34.

Thus, to ensure flexibility in a control system designed to operate four, for example, laundry machines, the internal test mode retrieves the state definitions and timer values as discussed above from volatile memory which is loaded with the desired values via the communications link 34 upon initial commencement of the internal test mode. To a limited extent, the internal test mode routine 120 also takes into account the particular appliance as determined by the Machine Type Determination routine, in particular to avoid machine damage by automatically turning off the motor for a predetermined pause time upon the occurrence of particular predetermined state changes, for example a change in motor speed, or a change in motor direction as occurs when changing from agitate to spin or vice versa.

The internal test mode routine 120 maintains two software timers, an ITM Timer which can be employed to establish any one of the three programmable timing functions, and a Pause Timer. Since the Internal Test Mode Routine 120 is executed one hundred twenty times per second, these two timers, when active, are maintained by incrementing each time execution passes through the Internal Test Mode Routine 120.

Figure 10A:
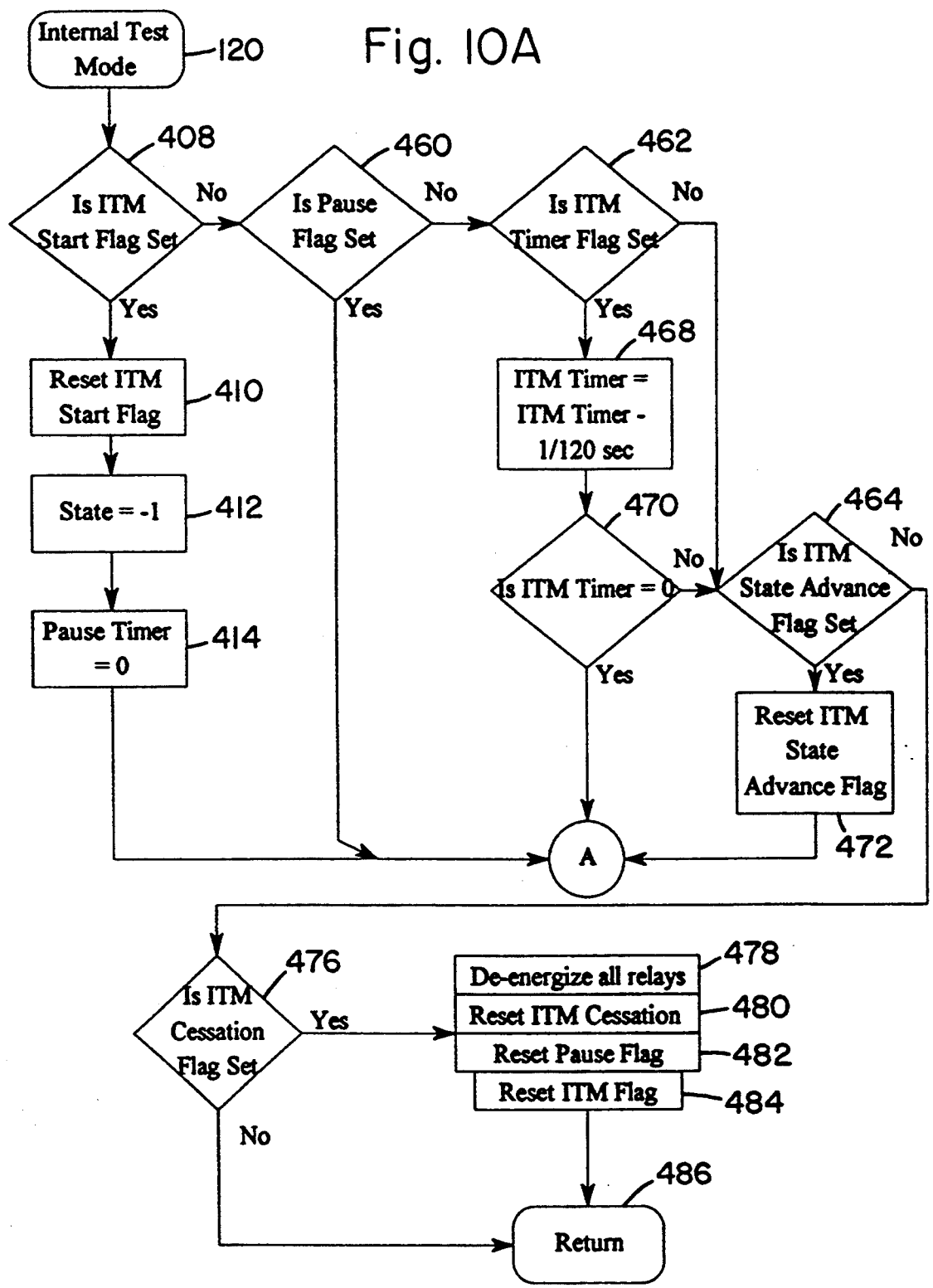
FIGS. 10A and 10B are a flowchart representing an internal test mode routine.
Figure 10B:
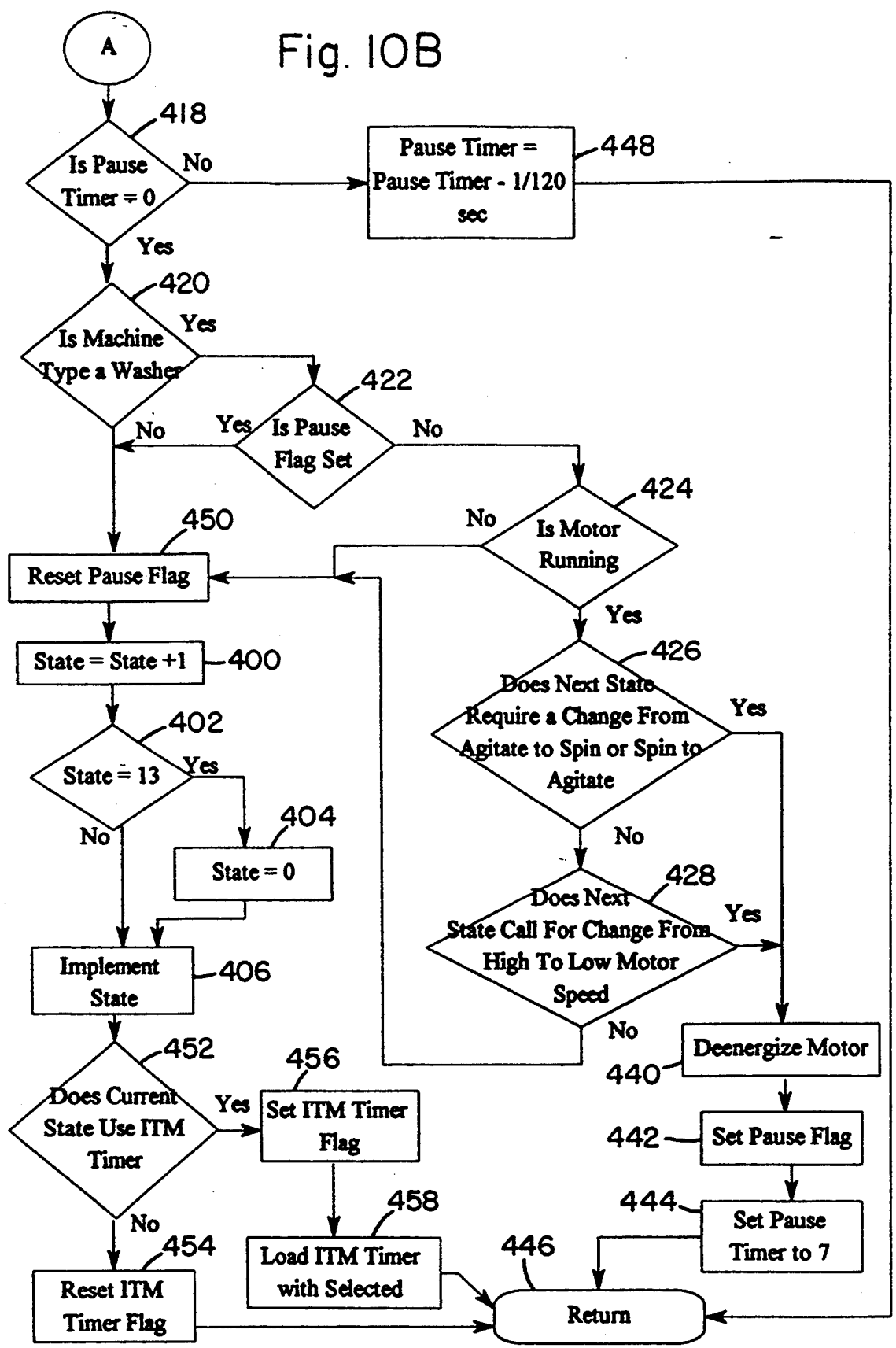

A significant part of the Internal Test Mode Routine is Box 400 of FIG. 10B, where a state counter is advanced. In decision Box 402 the state counter is tested to determine whether the state counter should be wrapped around to zero, which is done in Box 404 if necessary. In Box 406 the current state is implemented by the FIG. 1 microcontroller 22 outputting logic signals on selected ones of the input/output lines 24.

Referring back to FIG. 10A, upon initial selection of the internal test mode, the FIG. 10A Internal Test Mode Routine 120 is entered with the ITM Start Flag set, which is tested in decision Box 408. This causes the internal test mode routine to in essence be initialized, beginning with Box 410 which resets the ITM Start Flag so that, upon subsequent passes through the internal test mode routine, while the internal test mode is active, this particular initialization does not occur again.

In Box 412, the variable State is initialized to a value of −1 such that, in view of the incrementing in FIG. 10B Box 400, the first state actually implemented is state zero. As a final internal test mode initialization step, in Box 414 the Pause Timer is initialized to zero.

With internal test mode initialization complete, execution continues with FIG. 10B decision Box 418, which tests the state of the Pause Timer. Initially, the Pause Timer is zero, so execution proceeds to decision Box 420 which tests the previously-determined machine type, since it is only the washing machines which require a pause upon the occurrence of particular predetermined state changes.

Assuming the machine is a washer, then the decision in Box 420 is yes, whereupon the Pause Flag is tested in decision Box 422. If the Pause Flag is not set, then a decision is made whether to set it. Thus, in decision Box 424 it is determined whether the motor is already running. If the motor is running, then decision Boxes 426 and 428 test whether a state change is involved which requires a pause. If so, then in Box 440 the motor is deenergized, in Box 442 the Pause Flag is set, in Box 444 the Pause Timer is set to seven seconds, for example, and in Box 446 execution returns to the FIG. 6 main program, whereupon the Zero Cross Routine 104 is entered.

Upon subsequent passes through the Internal Test Mode Routine 120, until such time as seven seconds have elapsed, no action occurs other than the decrementing of the Pause Timer to zero. Thus, in FIG. 10B decision Box 418, the pause timer is determined to be non-zero, and in Box 448 the Pause Timer is decremented.

Assuming the Pause Timer is determined in decision Box 418 to be zero such that a state change can occur, execution proceeds from decision Box 418 to decision Box 420, then to decision Box 422 where the Pause Flag is determined to be set, and then to Box 450 where the Pause Flag is reset. The state is then advanced in Box 400. The new state is then implemented in Box 406 as discussed above.

In addition to the Pause Timer, the ITM Timer is maintained and utilized by other flowchart steps as indicated. If the new (current) state being implemented does not utilize the ITM Timer, then in decision Box 452 the answer is no, and the ITM Timer Flag is reset in Box 454. Conversely, if the current state uses the ITM Timer, an ITM Timer Flag is set in Box 456, and the ITM Timer is loaded in Box 458 with the programmed one of the three programmable timing function values (for example 60, 120 or 255 seconds). In any event, execution then returns to the FIG. 6 main program with the various flags set in anticipation of the next pass through the Internal Test Mode Routine.

Referring again to FIG. 10A, assuming the Internal Test Mode has been initialized, the Pause Flag, the ITM Timer Flag, the ITM State Advance Flag, and the ITM Cessation Flag are respectively tested in decision Boxes 460, 462, 464 and 476.

In particular, if, in decision Box 460 the Pause Flag is found to be set, then execution continues with FIG. 10B decision Box 418, as described above.

If the ITM Timer Flag is found to be set in decision Box 462, then the ITM Timer is decremented in Box 468, and tested for zero in decision Box 470. If the ITM Timer is zero, then the duration of the current state has elapsed, and a state advancement will occur in FIG. 10B Box 400. Otherwise, the ITM State Advance Flag is checked at decision Box 464.

If the ITM State Advance Flag is determined in decision Box 464 to be set, it is reset in Box 472, execution then proceeds with decision Box 418 of FIG. 10B as discussed above.

If the ITM Cessation Flag is determined in decision Box 476 to be set, all relays are deenergized at Box 478, the ITM Cessation Pause Flag is reset at Box 480, the Flag is reset at Box 482, and the ITM Flag is reset at Box 484. Execution then continues with Box 486 with a return to the FIG. 6 routine.

Again, although the routine of FIGS. 10A and 10B has been referred to as the "Internal Test Mode", the technique is not limited to testing. Thus, a complete appliance of any type may be controlled using this technique, as well as operating a machine in a test mode. In fact, a particular control could be modified from appliance to appliance or model to model of a given appliance by changing the state definitions or state sequences.

The Diagnostics Mode will now be considered with reference to the Diagnostics Routine 126 of FIGS. 11A through 11D. As noted above, the Diagnostics Mode is intended to be employed primarily by field service technicians to test and determine faulty appliance functional elements. In the particular implementation described herein, the remote unit 32 is programmed to translate machine-specific macro commands such as spin or agitate into particular relay state commands, which may be referred to as micro commands. Thus, service personnel are not required to learn the relationships between relay numbers and laundry functions.

The following TABLES V, VI and VII show particular relay command sequences transmitted from the remote unit 32 to the microcontroller 22 to cause particular machine functions to occur, depending upon the particular machine. These relay command sequences will be best understood in view of the controller schematic diagram of FIG. 1, in view of the individual appliance schematic diagrams of FIGS. 2, 3, 4 and 5.

TABLE V
RELAY COMMAND SEQUENCES FOR TWO-SPEED WASHER

| Mode | Relay Command Sequence |
|---|---|
| Gentle Agitate | RL2 reset, RL3 set, RL1 set |
| Normal Agitate | RL2 reset, RL3 reset, RL1 set |
| Spin | RL2 set, RL3 reset, RL1 set |
| Hot Water | RL4 set, RL5 reset |
| Warm Water | RL4 set, RL5 set |
| Cold Water | RL4 reset, RL5 set |

TABLE VI
RELAY COMMAND SEQUENCES FOR ONE-SPEED WASHER

| Mode | Relay Command Sequence |
|---|---|
| Agitate | RL2 reset, RL1 set |
| Spin | RL2 set, RL1 set |
| Hot Water | RL4 set, RL5 reset |
| Warm Water | RL4 set, RL5 set |
| Cold Water | RL4 reset, RL5 set |

TABLE VII
RELAY COMMAND SEQUENCES FOR GAS AND ELECTRIC DRYERS

| Mode | Relay Command Sequences |
|---|---|
| Tumble with No Heat | RL4 set, RL5 set, RL2 set, RL3 reset, RL1 reset |
| Tumble with Low Heat | RL4 set, RL5 set, RL2 set, RL3 set, RL1 reset |
| Tumble with High Heat | RL4 set, RL5 set, RL2 set, RL3 set, RL1 set |

Briefly considering the two-speed washer (TABLE V, FIG. 1 and FIG. 2), it will be seen that relay RL1 controls motor energization, relay RL2 controls motor direction, relay RL3 controls motor speed, relay RL4 controls the hot water solenoid 54, and relay RL5 controls the cold water solenoid 52, which comprise functional elements within the washing machine.

Relay command sequences are such that the appliance is operated in a logical and safe manner. Thus, for the gentle agitate, normal agitate and spin selections, first the state of relay RL2 is established to select motor direction, then the state of relay RL3 is established to select motor speed, and finally relay RL1 is set to turn on the motor.

For water temperature selections, it will be seen that appropriate states for hot water solenoid relay RL4 and cold water solenoid relay RL5 are established.

For a one-speed washer, the relay command sequences of TABLE VI will be understood in view of FIGS. 1 and 3. TABLE VI will be recognized as a simplified version of TABLE V, in that commands for relay RL3 which selects motor speed in TABLE V are omitted.

The relay command sequences for the gas and electric dryers are presented in TABLE VII, which will be understood in view of FIG. 1 in conjunction with either FIG. 4 (for a gas dryer) or FIG. 5 (for an electric dryer). In the case of the dryers, relay RL1 controls dryer heat, relay RL2 energizes the motor, relay RL3 energizes the heat, and relays RL4 and RL5 disconnect the test circuitry.

Although not indicated in TABLES V, VI and VII, it will be appreciated there are also commands to terminate a particular state. Thus, washer agitate or spin operations are ended by resetting motor relay RL1; washer hot and cold water fill operations are ended by turning off relays RL4 and RL5 as appropriate; dryer tumble operations are ended by turning off motor relay RL2, and dryer heating operations are terminated by turning off relays RL1 and RL3.

It will also be appreciated that the microcontroller 22, based on the set and reset states of the various relays, can recognize which particular operational mode is currently in effect and which has been commanded.

The actual Diagnostics Routine 126 of FIGS. 11A through 11D serves to set and reset the various relays upon command as just discussed, and additionally, in the case of a washing machine, includes provision to force a pause in motor operation upon the occurrence of predetermined changes in state, as already discussed hereinabove. In this regard, a seven-second safety timer is maintained in software, and a Delayed Action Flag is employed, to indicate that a delayed action is to be implemented when the time period established by the Safety Timer has elapsed.

Very briefly, the diagnostics routine 126 responds to three flags in particular transmitted from the remote unit 32, a start diagnostics flag, a stop diagnostics flag and a new diagnostics command flag, which are respectively tested in decision Boxes 602, 604 and 606 as indicated.

Figure 11A:
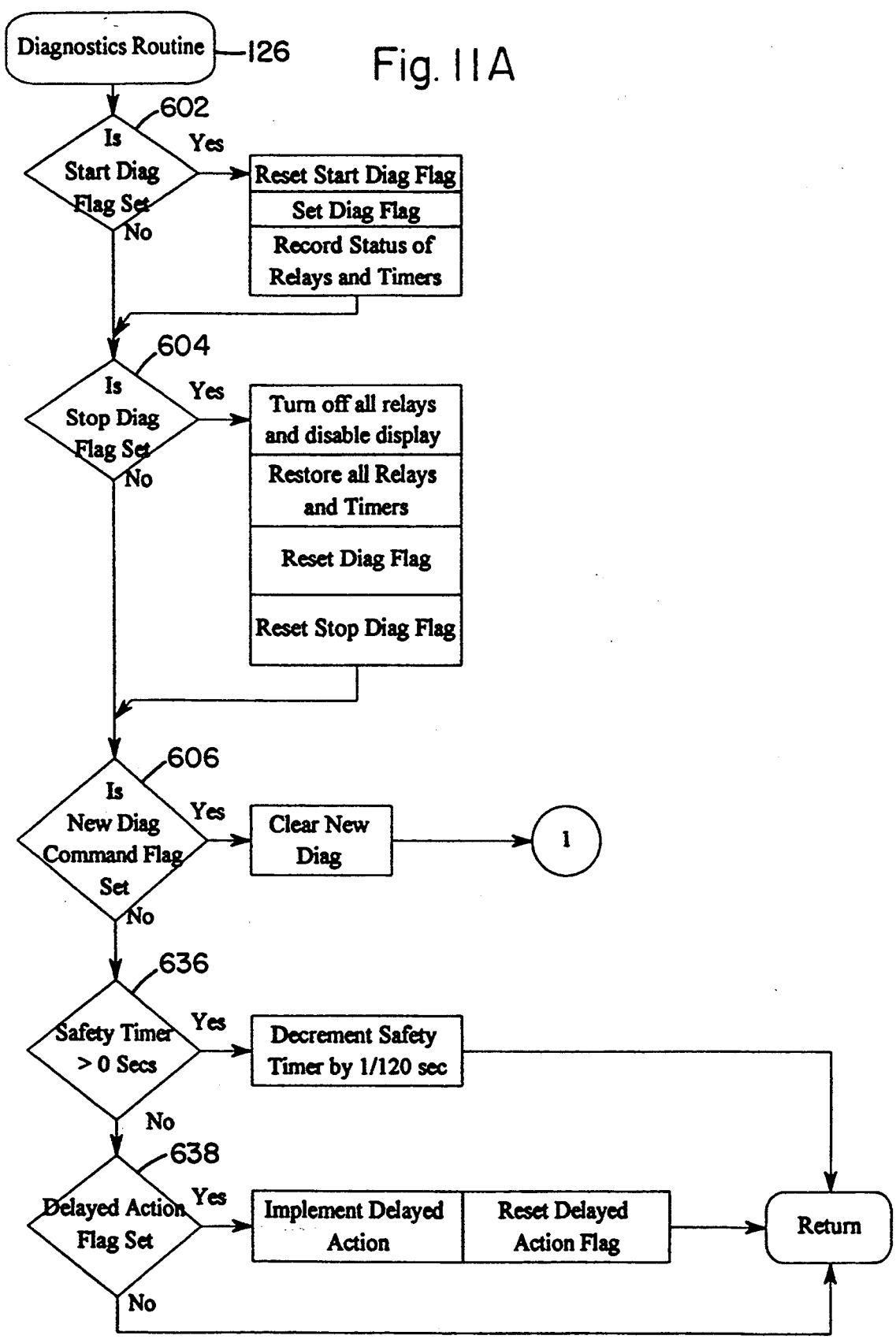
FIGS. 11A through 11D are a flowchart representing a diagnosis mode routine.
Figure 11B:
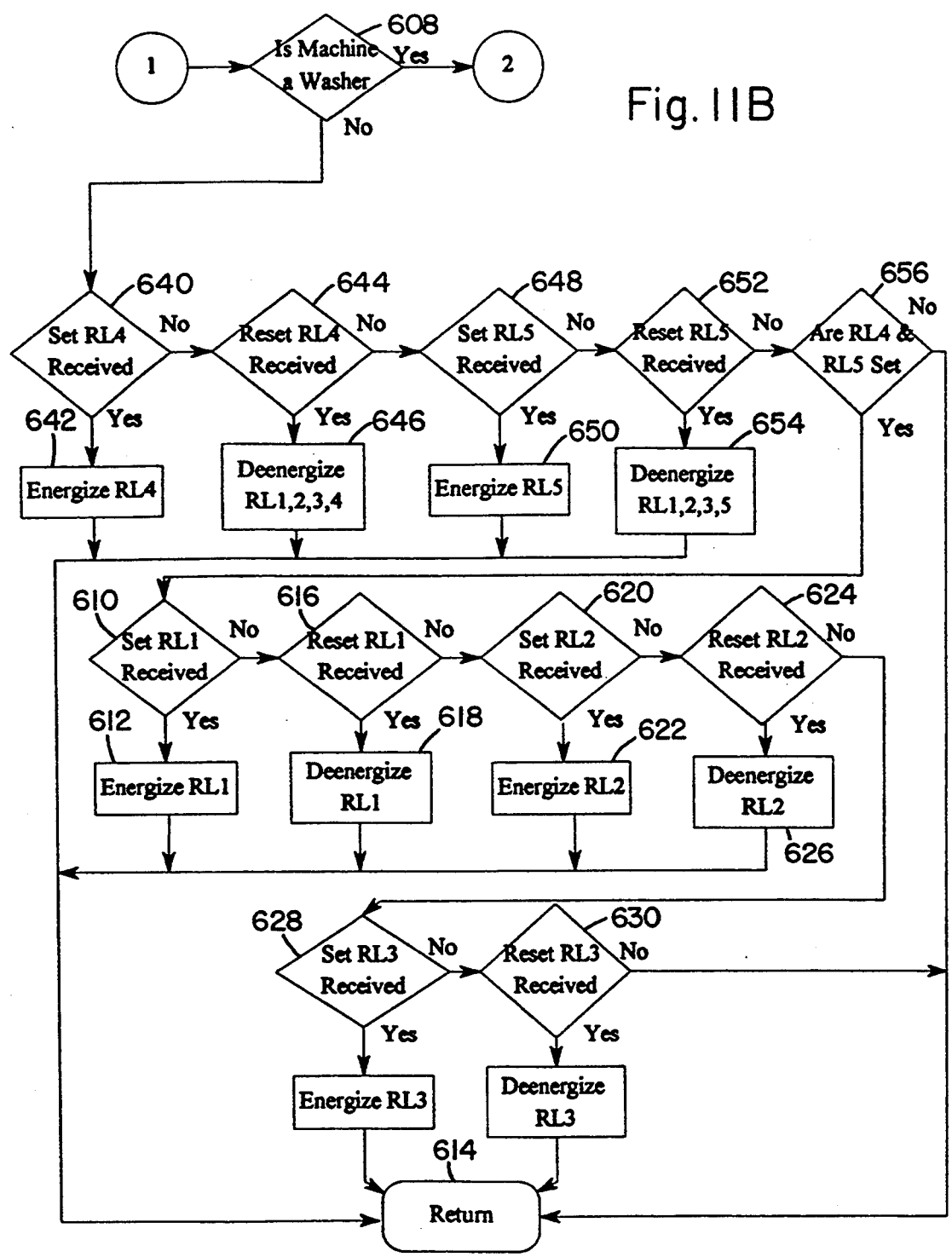

When a new diagnostics command is received, program execution branches to FIG. 11B, decision Box 608, which determines whether the machine is a washer. If the machine is not a washer, that is, is a dryer, then execution proceeds to decision Box 640, which tests whether the new command is to set RL4, i.e., to disconnect one of the test circuits. If yes, then RL4 is set in Box 642, and the routine returns to the calling routine in Box 614. Similarly, decision Box 644 tests whether the command is to reset RL4 and, if so, in Box 646 RL3, RL2, RL1 and RL4 are reset. RL4 and RL5 both must be set prior to activating RL3, RL2 and RL1 in order to maintain the integrity of the test circuit. If this condition is not met, the test circuit may be damaged, but the machine will still be functional. Decision Box 648 tests whether the new command is to set RL5, i.e., to disconnect one of the test circuits. If yes, then RL5 is set in Box 650, and the routine returns to the calling routine in Box 614. Similarly, decision Box 652 tests whether the command is to reset RL5, and if so, in Box 654 RL3, RL2, RL1 and RL5 are reset. Decision Box 656 is used to prevent the reception of commands to set RL3, RL2 or RL1 prior to removal of the test circuits. Decision Box 610 tests whether the new command is to set relay RL1, i.e., to activate the high heater. If yes, then relay RL1 is set in Box 612 to activate the high heater, and the routine returns to the calling program in Box 614. Similarly, decision Box 616 tests whether the command is to reset the relay RL1, and, if so, in Box 618 relay RL1 is reset. Decision Box 620 tests whether the command is to set relay RL2, in which case relay RL2 is set in Box 622 to energize the motor. Decision Box 624 tests whether the command is to reset relay RL2, in which case relay RL2 is reset in Box 626 to deenergize the motor.

Decision Box 62 tests whether the command is to set relay RL3 for the low heater, and decision Box 630 tests whether the command is to turn off heat, and in each case appropriate action is taken.

Figure 11C:
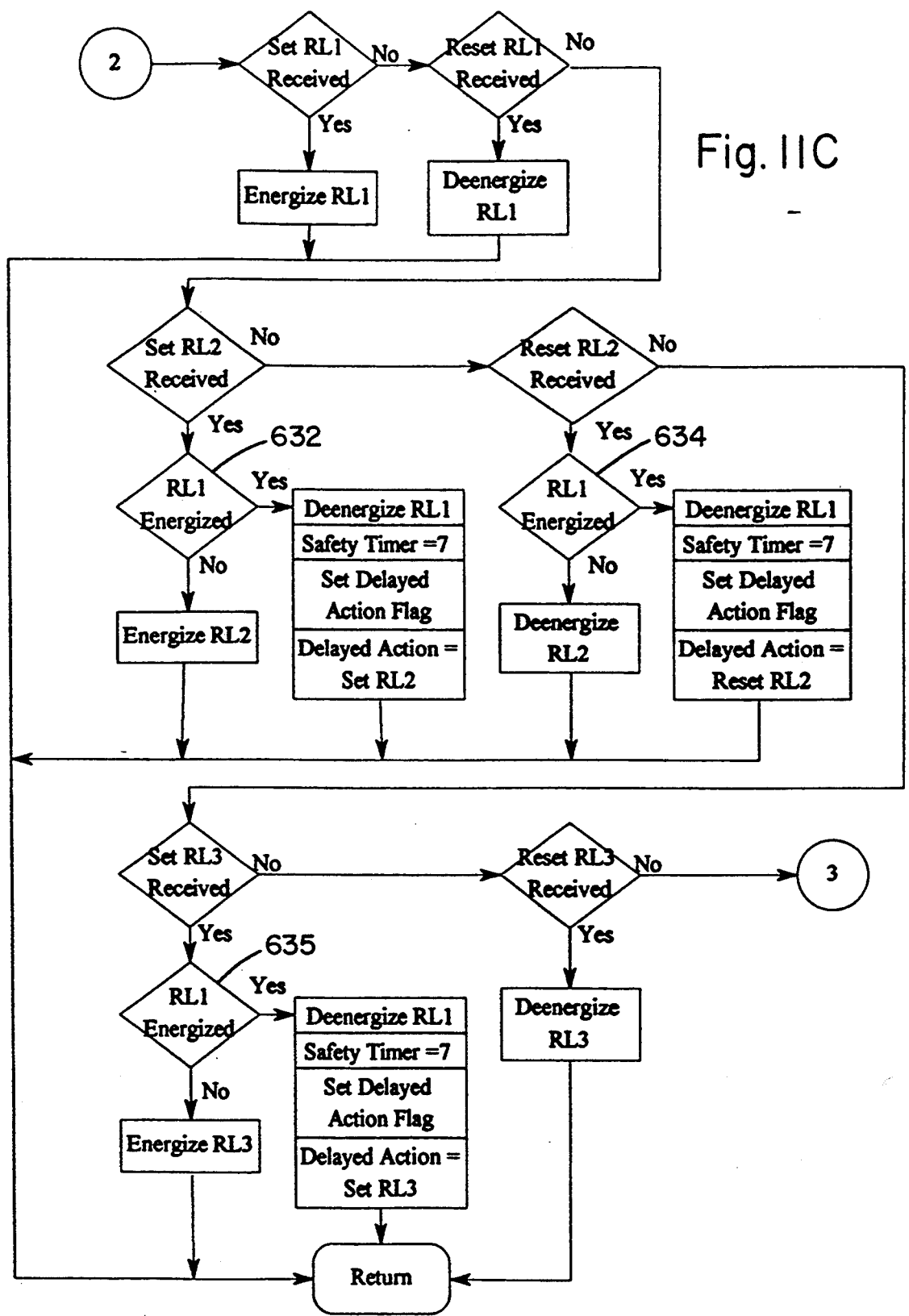
Figure 11D:
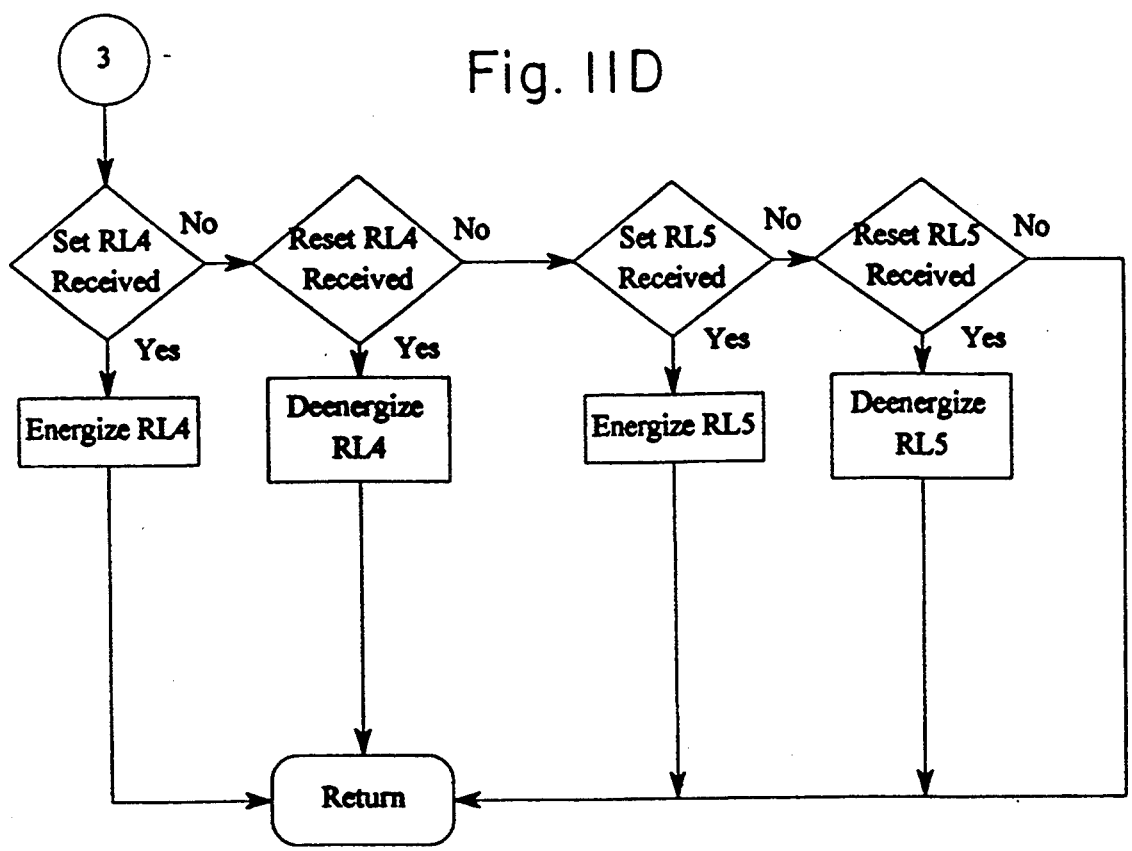
Figure 12A:
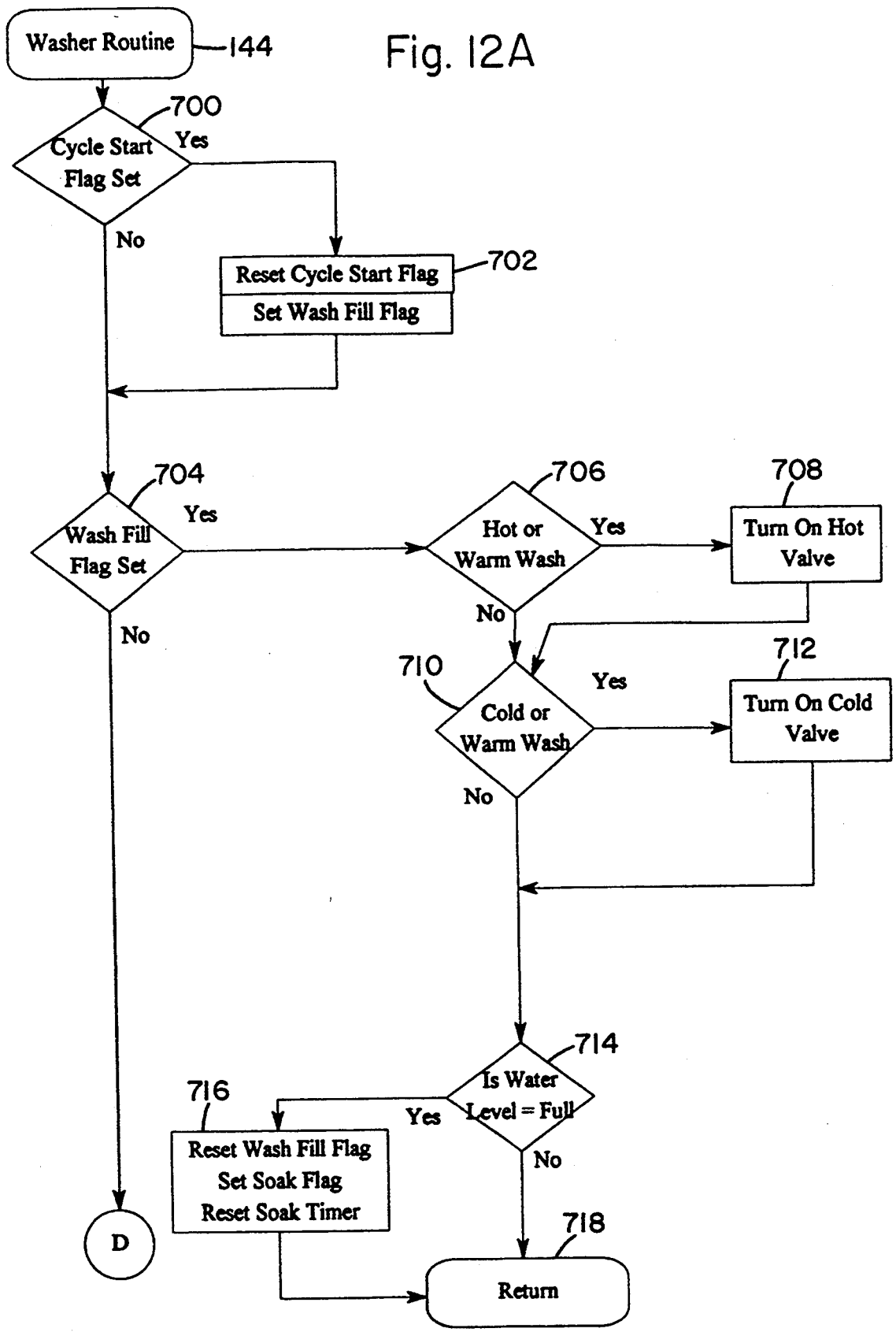
Figure 12B:
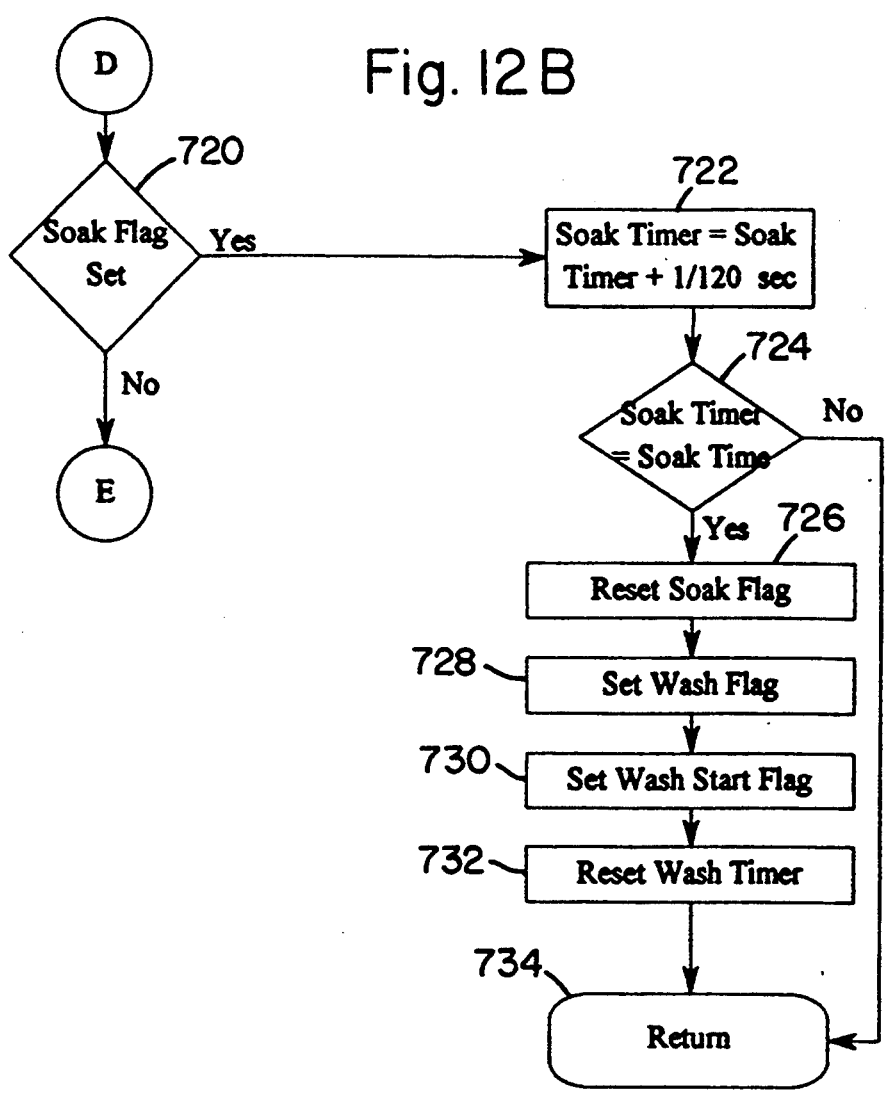
Figure 12C:
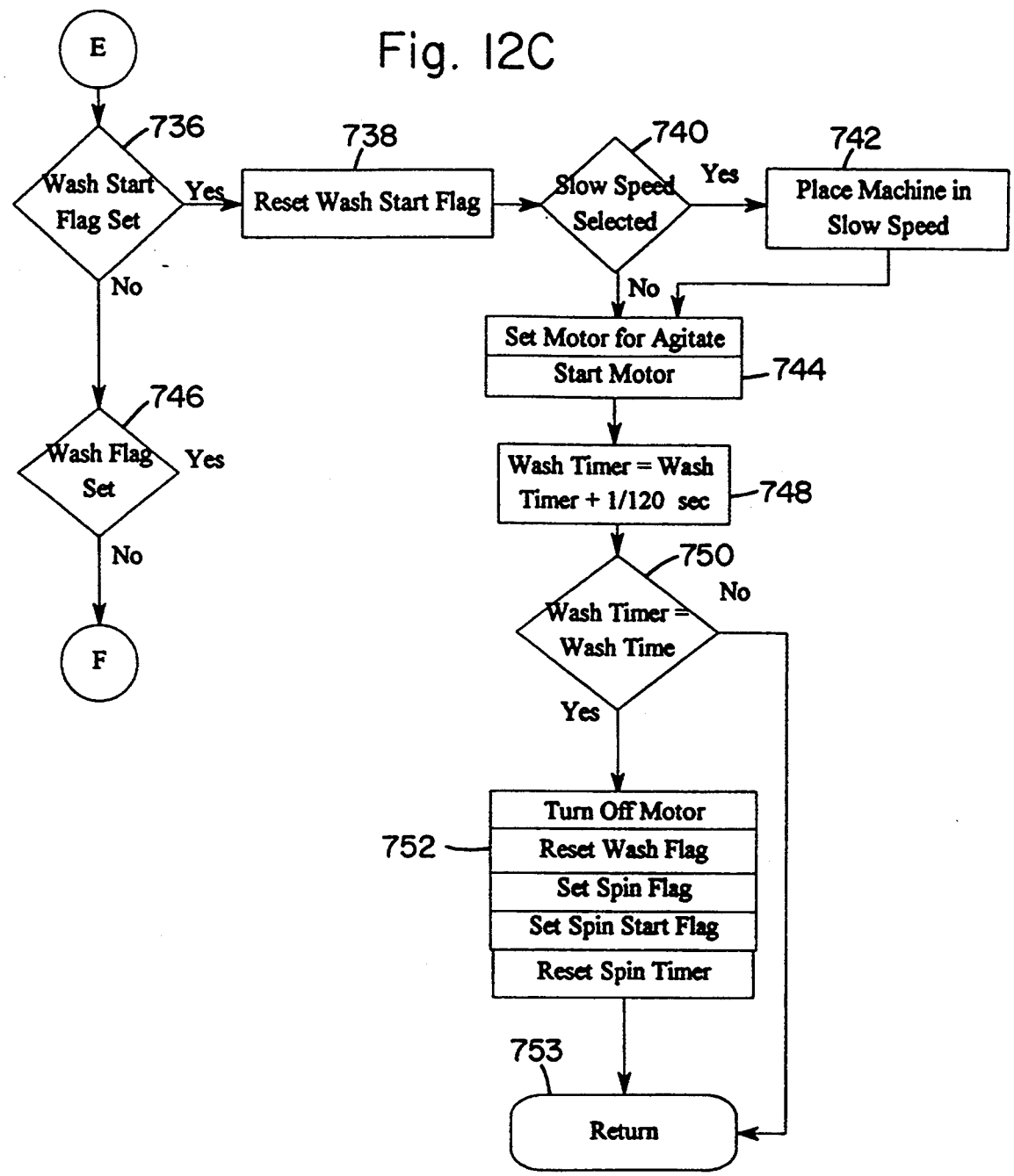
Figure 12D:
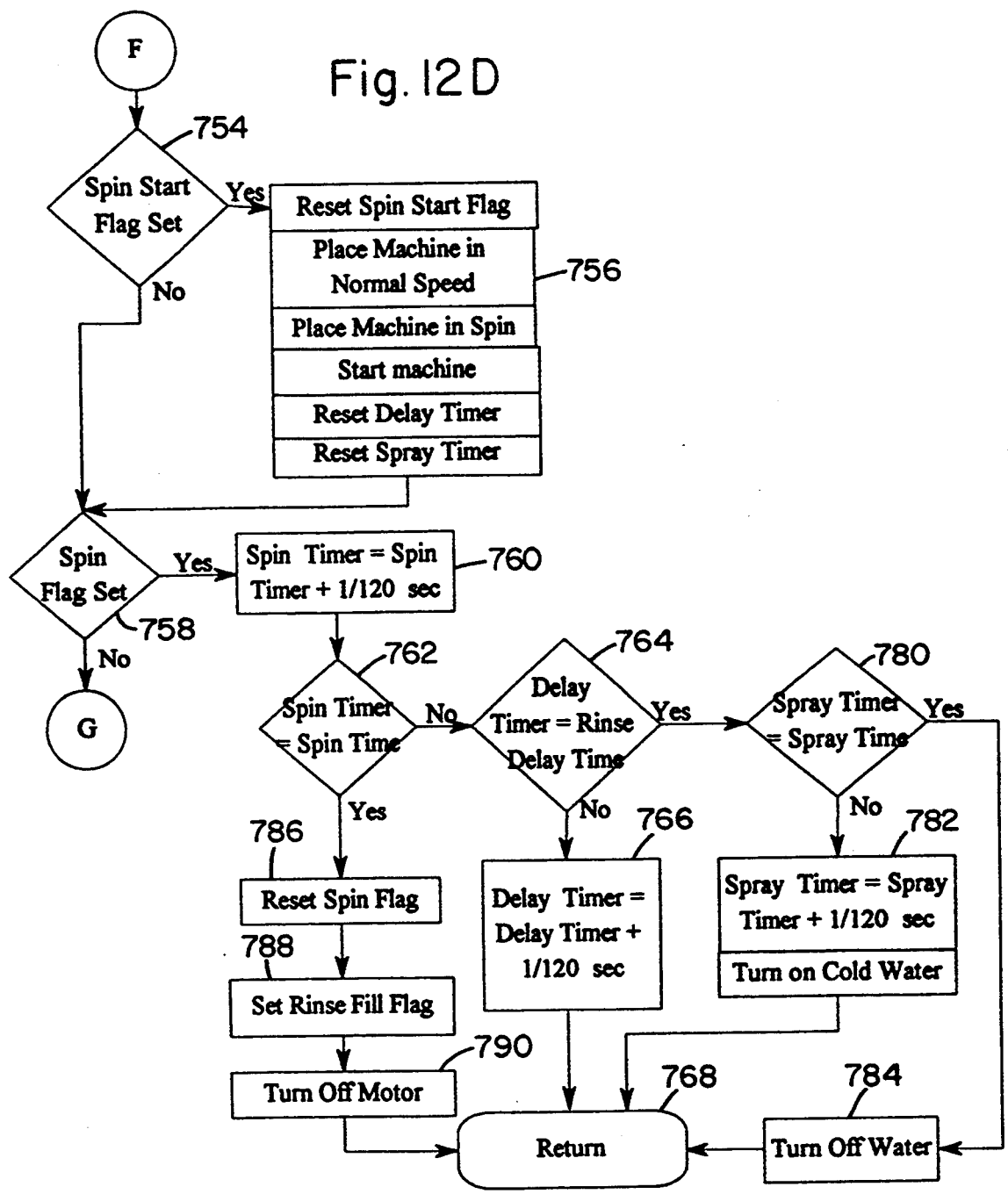
Figure 12F:
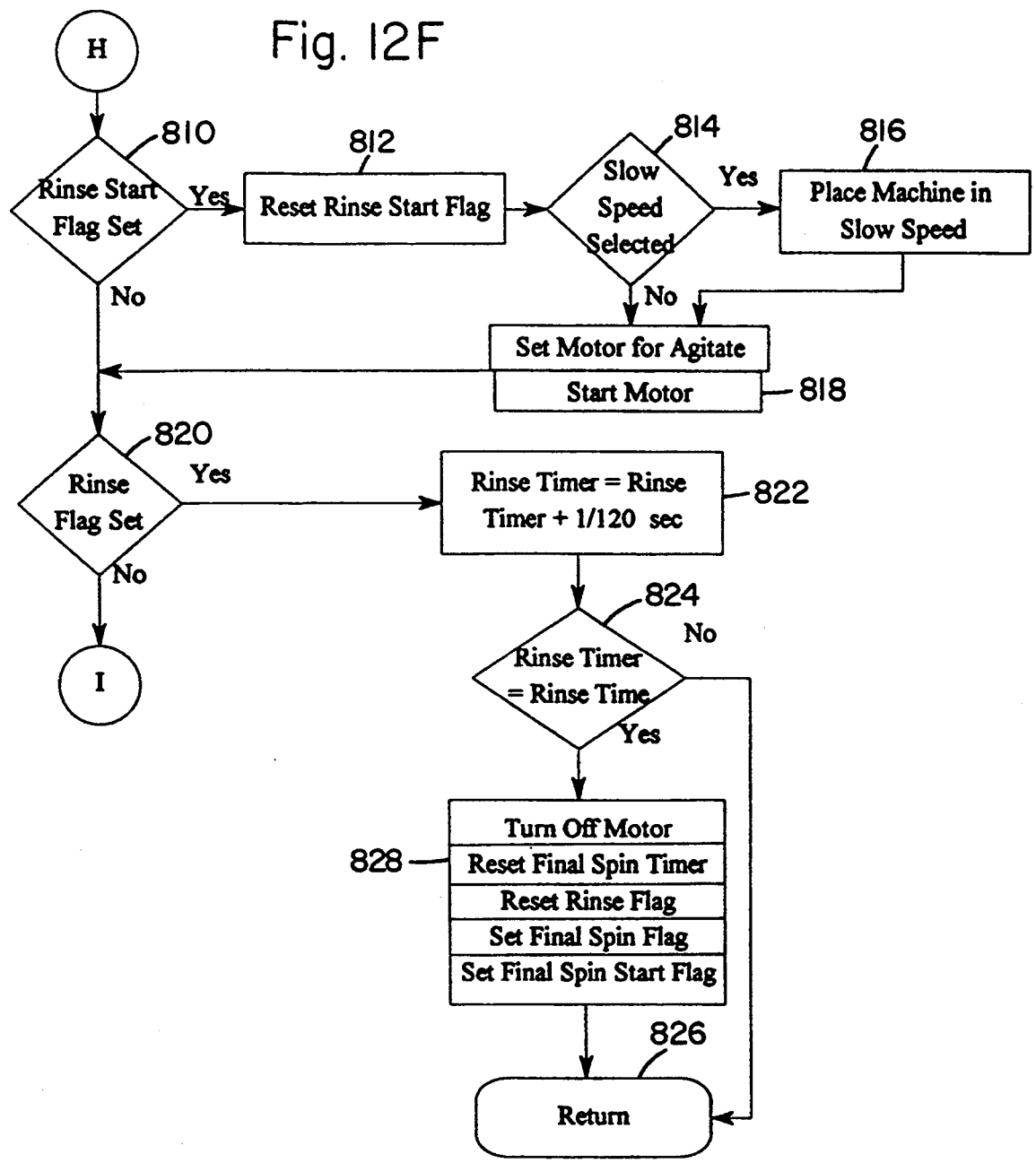
Figure 12G:
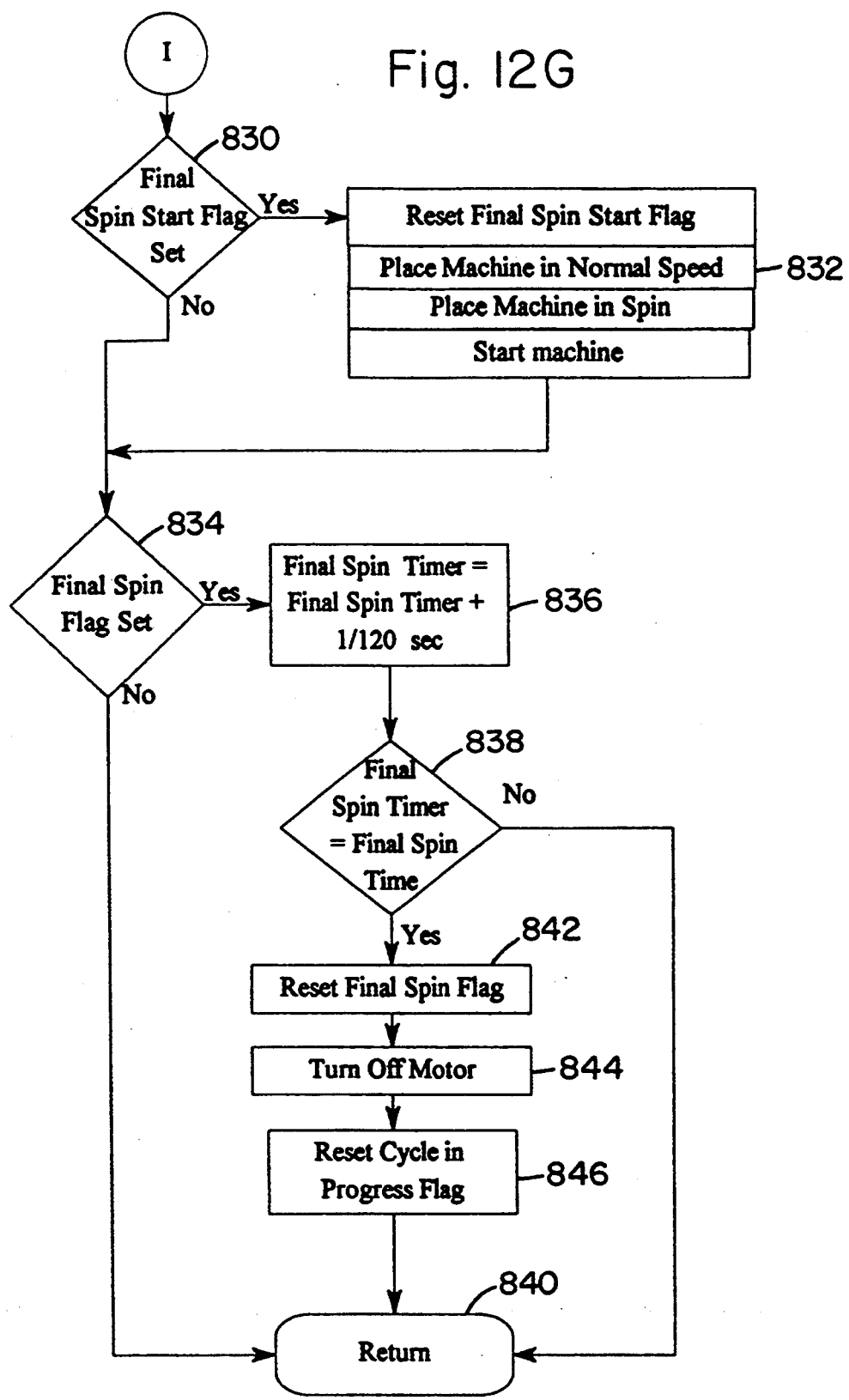

In the case of a washing machine, the flowchart instructions of FIGS. 11C and 11D similarly test the commands to set and reset relays RL1, RL2, RL3, RL4 and RL5 to cause an appropriate machine action. In addition, in decision Boxes 632 and 634 when a test of the command for relay RL2 indicates a change in motor direction is being requested while the motor is turned on, such as when changing from agitate to spin, or vice versa, the motor is turned off, the safety timer is set, the pending command is saved as a variable Delayed Action, and the Delayed Action Flag is set. Likewise, if a command is issued to shift into low speed, Set RL3, it is determined in decision Box 635 whether the motor is turned on. If the motor is on, the motor is turned off, the pending command is saved as the variable Delayed Action, and the Delayed Action Flat is set. These conditions are subsequently tested in FIG. 11A decision Box 636 and 638.

Figure 13A:
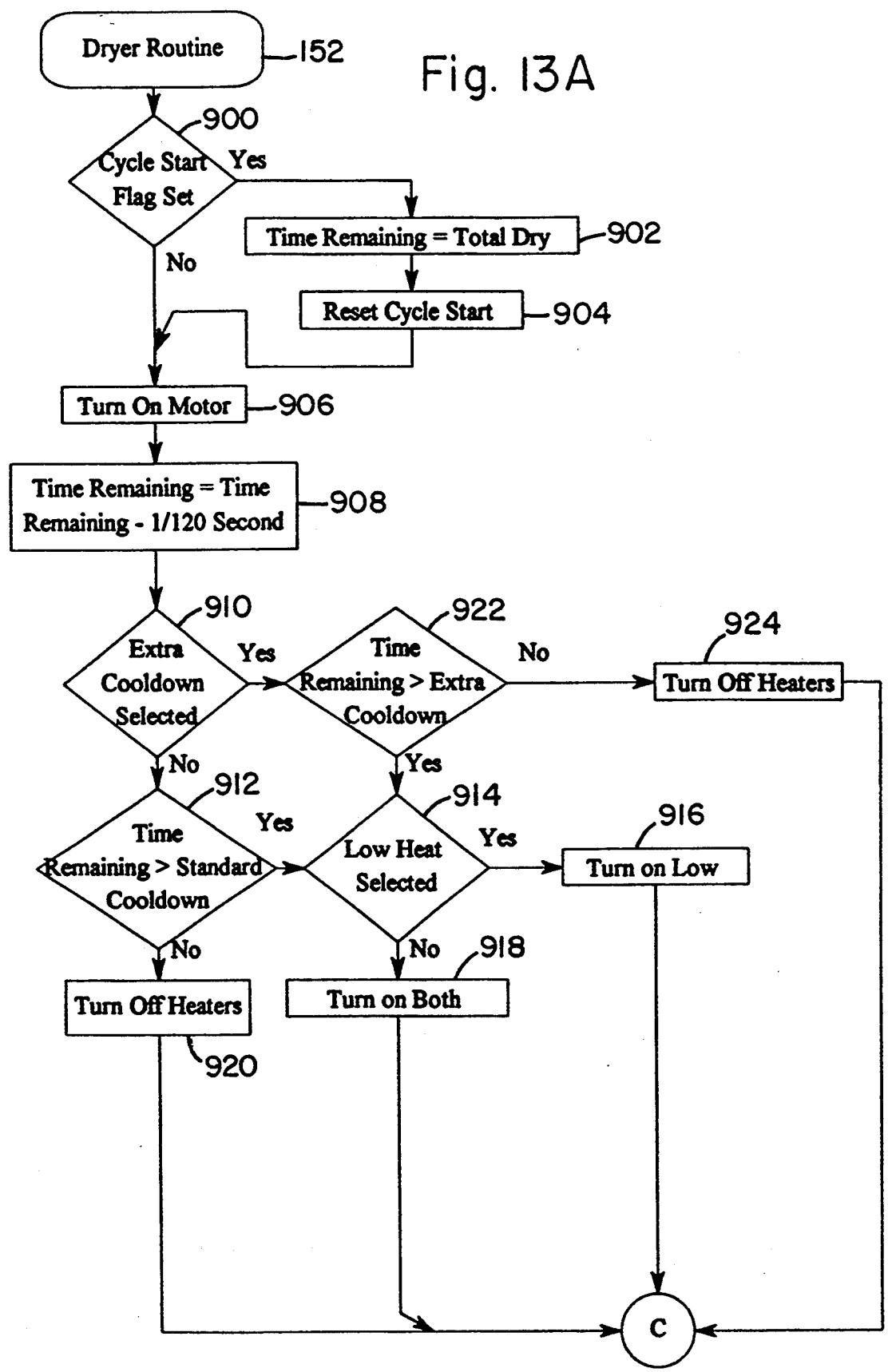
FIGS. 13A and 13B are a flowchart representing a clothes dryer control routine.
Figure 13B:
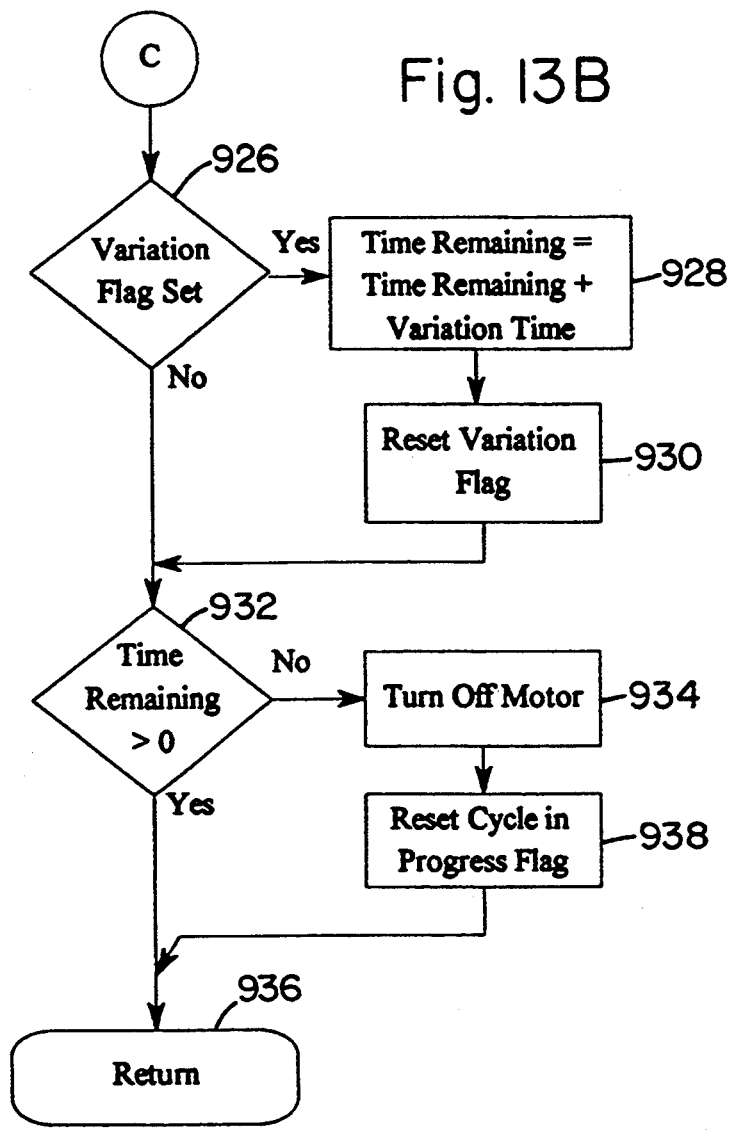

Finally, a detailed flowchart for normal washing machine 144 operation is shown in FIGS. 12A through 12G, and a flowchart for the dryer routine 152 is shown in FIGS. 13A and 13B.

Execution of the washer routine begins with determining the status of the Cycle Start Flag at decision Box 700. If the flag is set, a new cycle is set to begin, and the Cycle Start Flag is reset, and the Wash Fill Flag is set at Box 702. Execution continues with decision Box 704 if the Cycle Start Flag is not set at decision Box 700 and upon completion of Box 702. If the Wash Fill Flag is set at decision Box 704, the selector switches are read to determine if hot or warm water is being called for at decision Box 706. If hot or warm water is required, the hot water solenoid 54 is energized at Box 708. Decision Box 710 determines if cold or warm water is needed and Box 712 energizes the cold water solenoid 54 as required. The status of the water level sensor switch 58 is monitored at decision Box 714, and if a Full condition is not detected, a return to the FIG. 6 routine is executed at Box 718. If the Full condition is met at decision Box 714, the Wash Fill Flag is reset to indicate completion of the wash fill process, and the soak timer is reset and the soak flag is set in preparation for the impending soak procedure at Box 716 prior to returning to the FIG. 6 routine at Box 718.

If the Wash Fill Flag is not set at decision Box 704, the status of the Soak Flag is determined at decision Box 720. If the Soak Flag is set, indicating a pending soak procedure, the Soak Timer is incremented at Box 722 and the Soak Timer is compared against a predetermined Soak Time at decision Box 724. If the Soak Timer is not equal to the predetermined Soak Time, the execution continues with a return to the FIG. 6 routine at Box 734. If the Soak Timer is equal to the predetermined Soak Time, indicating a completion of the soak period, the Soak Flag is reset at Box 726. To prepare the machine for the pending wash cycle, the Wash Flag is set at Box 728, the Wash Start Flag is set at Box 730, and the Wash Timer is reset at Box 732 prior to returning to the FIG. 6 routine at Box 734.

If the Soak Flag is not set at decision Box 720, the status of the Wash Start Flag is checked at decision Box 736, if the Wash Start Flag is set, the Wash Start Flag is reset at Box 738. The selector switches are monitored to determine if slow agitation is requested at decision Box 740. If slow agitation is required, the washing machine is placed into slow speed at Box 742 by energizing RL3. The motor direction is then set for agitation and the motor energized at Box 744. Upon energizing the motor at Box 744 or determining that the Wash Start Flag is not set at decision Box 736, the status of the Wash Flag is checked at decision Box 746. If the Wash Flag is set, the Wash Timer is incremented at decision Box 748 and compared against a predetermined Wash Time at decision Box 750. If the Wash Timer has not yet reached the predetermined Wash Time, a return to the FIG. 6 routine is executed at Box 753; otherwise, if the Wash Timer is equal to the Wash Time, the motor is turned off, and the Wash Flag is reset at Box 752 to indicate completion of the wash phase, and the Spin Flag is set, the Spin Start Flag is set and the Spin Timer is reset in preparation for the impending spin phase prior to returning to the FIG. 6 routine.

If the Wash Flag is not set at decision Box 746, the status of the Spin Start Flag is checked at decision Box 754. If the Spin Start Flag is set, the spin is initiated by resetting the Spin Start Flag, setting the machine into the normal speed and spin configuration, energizing the motor, and resetting the Delay Timer and Spray Timer at Box 756. Execution then continues with decision Box 758 where the status of the Spin Flag is checked. If the Spin Flag is set, the Spin Timer is incremented at Box 760 and compared against a predetermined Spin Time at decision Box 762. If the Spin Timer has not yet reached Spin Time, the Delay Timer is compared to a predetermined Rinse Delay Time at decision Box 764. If the Delay Timer has not yet reached the predetermined time, the Delay Timer is incremented at Box 766 prior to the returning to the FIG. 6 routine at Box 768. If the Delay Timer has reached the predetermined Rinse Delay Time at decision Box 764, the Spray Timer is compared against a predetermined Spray Time at decision Box 780. If the Spray Timer has not yet reached the Spray Time, the Spray Timer is incremented and the cold water solenoid 52 is turned on at Box 782 prior to returning to the FIG. 6 routine. If the Spray Timer is equal to the Spray Time, the spray rinse process is complete and the cold water solenoid 52 is turned off at Box 784 prior to returning to the FIG. 6 routine. Once the Spin Timer reaches the predetermined Spin Time at decision Box 762, the Spin Flag is reset at BoX 786, the Rinse Fill Flag is set at Box 788 and the motor stopped at Box 790 to complete the spin process and prepare for the impending rinse fill process. It will be understood that the delay and spray times are incorporated into the spin time; the spin process is running concurrently with first the delay process and secondly with the spray process.

If the Spin Flag is not set at decision Box 758, the status of the Rinse Fill Flag is checked at decision Box 792. If the Rinse Fill Flag is set, the warm rinse option is checked at decision Box 796. The warm rinse option may be set by a jumper, switch or programmed as described in the above-incorporated application Ser. No. 07/969,139. If the warm rinse option is requested, the hot water solenoid 54 is turned on at Box 798. Regardless of the warm rinse option, the cold valve is turned on at Box 800. The water level sensor switch 58 is read and checked for a full condition at decision Box 802. If the full condition is not detected, a return to the FIG. 6 routine is executed at Box 804. Once a full condition is detected, the Rinse Fill Flag is reset at Box 806 to complete the Rinse Fill process, and the Rinse Timer is reset, the Rinse Flag is set and the Rinse Start Flag is set at Box 808 to prepare for the impending rinse agitation.

If the Rinse Fill Flag is not set at decision Box 792, the Rinse Start Flag is checked at decision Box 810. The sequence beginning with Box 810 and ending with Box 826 performs the rinse agitation process in the same manner as the sequence beginning with Box 736 and ending with Box 753 performs the wash agitation. Rather than setting the machine for spin as shown in Box 752, the machine is prepared for Final Spin in Box 828.

If the Rinse Flag is not set at decision Box 820, the Final Spin Start Flag is checked at decision Box 830. If the Final Spin Start Flag is set, the Final Spin Start Flag is reset, the machine placed into a normal speed spin configuration, and the motor started in Box 832. The Final Spin Flag is monitored at decision Box 834. If the Final Spin Flag is set, the Final Spin Timer is incremented at Box 836, and the Final Spin Timer is compared against a predetermined Final Spin Time at decision Box 838. If the Final Spin Timer is not equal to the Final Spin Time, a return to the FIG. 6 routine is executed at Box 840. If the Final Spin Timer is equal to the Final Spin Time, the Final Spin Flag is reset at Box 842 and the motor 46 stopped at Box 844 to complete the Final Spin Process and the Cycle in Progress Flag is reset at Box 846 to indicate completion of the wash cycle.

Execution of the Dryer Routine begins by checking the Cycle Start Flag at decision Box 900 and setting the Time Remaining to the predetermined Total Dry Time at decision Box 902 and resetting the Cycle Start Flag at decision Box 904 if the Cycle Start Flag is found to be set at decision Box 900. The motor 70 is then energized at Box 906, and the Time Remaining is decremented 1/120 second, the time period for the execution of one complete pass through the program, at decision Box 908. The selector switch is then read to determine if extra cool down is required at decision Box 910. If extra cool down is not required, the Time Remaining is compared against the predetermined Standard Cool down at decision Box 912. As long as the time Remaining is greater than the Standard Cool down, the heaters will be energized. Decision Box 914 determines if low heat is selected, if selected, only the low heater is energized at decision Box 916; otherwise, both heaters are energized at decision Box 918. If the Time Remaining is not greater than the Standard Cool down at decision Box 912, both heaters are turned off at decision Box 920. If extra Cool down is selected at decision Box 910, the Time Remaining is compared against the Extra Cool down at decision Box 922. If the Time Remaining is greater than the Extra Cool down, Boxes 914, 916 and 918 are executed as previously described. If the Time Remaining is not greater than the Extra Cool down, the heaters are turned off at Box 924.

Execution continues with decision Box 926 from Boxes 916, 918, 920 and 924. The Variation Flag, which is set in the FIG. 6 routine, is checked in decision Box 926. If the Variation Flag is set, the predetermined Variation Time is added to the Time Remaining at decision Box 928, and the Variation Flag is reset at decision Box 930. Decision Box 932 then determines if the Time Remaining is greater than zero and executes a return to the FIG. 6 routine at decision Box 936 if the Time Remaining is greater than zero. If the Time Remaining has reached zero, the motor is turned off at Box 934 and the Cycle in Progress Flag is reset at decision Box 938 to complete the dryer cycle.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An electronic control system operable to effect a sequence of operations of a machine within which said electronic control system is installed, the machine including a plurality of functional elements for implementing a plurality of machine functions, said control system comprising:
    a controller having output lines for activating the functional elements; and
    a communications link connected to said controller for receiving externally generated test parameters for said controller and inputting the test parameters to said controller;
    said controller including means for outputting signals on said output lines for activating the machine functional elements in accordance with the test parameters received from said communications link.

2. An electronic control system operable to effect a sequence of operations of a machine within which said electronic control system is installed, the machine including a plurality of functional elements for implementing a plurality of machine functions, said control system comprising:
    a controller having output lines for activating the functional elements; and
    a wireless communications link connected to said controller for receiving externally generated parameters and inputting the parameters to said controller;
    said controller including means for outputting signals on said output lines for activating the machine functional elements in accordance with the parameters received from said wireless communications link.

3. An electronic control system in accordance with claim 2, wherein said wireless communications link comprises an optical communications link.

4. An electronic control system in accordance with claim 2, which is operable to effect sequences of operations of particular ones of a plurality of different laundry appliances.

5. An electronic control system in accordance with claim 4, which is operable to effect sequences of operations of a clothes washer and of a clothes dryer.

6. An electronic control system operable to effect a sequence of operations of a machine within which said electronic control system is installed, the machine including a plurality of functional elements for implementing a plurality of machine functions, said control system comprising:

a controller having output lines for activating the functional elements; and a communications link connected to said controller for receiving externally generated control parameters for said controller and inputting said parameters to said controller, said parameters comprising specifications of a plurality of particular functional element states to be established in a sequence;

said controller including means for outputting signals on said output lines for activating the machine functional elements in accordance with the parameters received from said communications link.

7. An electronic control system in accordance with claim 6, wherein said parameters further comprise specifications of time durations for selected ones of the functional element states.

8. An electronic control system in accordance with claim 6, wherein:

said controller has an output line for controlling a motor within the machine; and said controller includes means for turning OFF the motor for a predetermined pause time upon the occurrence of particular predetermined state changes.

9. An electronic control system operable to effect a sequence of operations of a machine within which said electronic control system is installed, the machine including a plurality of functional elements for implementing a plurality of machine functions, said control system comprising;

a controller having output lines for activating the functional elements; and a communications link connected to said controller for receiving externally generated control parameters for said controller and inputting said parameters to said controller, said parameters comprising commands to effect particular changes to particular functional element states;

said controller including means for outputting signals on said output lines for activating the machine functional elements in accordance with the parameters received from said communications link.

10. An electronic control system in accordance with claim 9, wherein said controller has an output line for controlling a motor within the machine; and said controller includes elements for turning OFF the motor for a predetermined pause time upon the occurrence of particular predetermined state changes.

11. An electronic control system operable to effect sequences of operations of particular ones of a plurality of different laundry appliances including a plurality of clothes washer models and a clothes dryer within which said electronic control system is installed, the particular appliance including a plurality of functional elements for implementing a plurality of machine functions, said control system comprising:

a controller having output lines for activating the functional elements; and a communications link connected to said controller for receiving externally generated parameters and inputting the parameters to said controller;

said controller including means for outputting signals on said output lines for activating the machine functional elements in accordance with the parameters received from said communications link.

12. An electronic control system in accordance with claim 11, which is operable to effect sequences of operations of a plurality of clothes dryer models.

13. An electronic control system operable to effect sequences of operations of particular ones of a plurality of different laundry appliances including a clothes washer and a plurality of clothes dryer models within which said electronic control system is installed, the particular appliance including a plurality of functional elements for implementing a plurality of machine functions, said control system comprising:

a controller having output lines for activating the functional elements; and a communications link connected to said controller for receiving externally generated parameters and inputting the parameters to said controller;

said controller including means for outputting signals on said output lines for activating the machine functional elements in accordance with the parameters received from sad communications link.

\* \* \* \* \*